United States Patent
Brudeli

(10) Patent No.: US 11,554,659 B2
(45) Date of Patent: Jan. 17, 2023

(54) POWERTRAIN, VEHICLE AND METHOD OF PERFORMING A GEARSHIFT IN THE POWERTRAIN

(71) Applicant: Brudeli Green Mobility AS, Hokksund (NO)

(72) Inventor: Geir Brudeli, Hokksund (NO)

(73) Assignee: Brudeli Green Mobility AS, Hokksund (NO)

( * ) Notice: Subject to any disclaimer, the term of this patent is extended or adjusted under 35 U.S.C. 154(b) by 0 days.

(21) Appl. No.: 17/262,753

(22) PCT Filed: Aug. 15, 2019

(86) PCT No.: PCT/EP2019/071910
§ 371 (c)(1),
(2) Date: Jan. 25, 2021

(87) PCT Pub. No.: WO2020/035558
PCT Pub. Date: Feb. 20, 2020

(65) Prior Publication Data
US 2021/0309095 A1  Oct. 7, 2021

(30) Foreign Application Priority Data
Aug. 15, 2018 (NO) .................................... 20181078

(51) Int. Cl.
*B60K 6/547* (2007.10)
*B60K 6/365* (2007.10)
(Continued)

(52) U.S. Cl.
CPC ............. *B60K 6/547* (2013.01); *B60K 6/365* (2013.01); *B60K 6/442* (2013.01); *F16H 61/0403* (2013.01); *F16H 2061/0422* (2013.01)

(58) Field of Classification Search
CPC ........ B60K 6/547; B60K 6/365; B60K 6/442; F16H 61/0403; F16H 2061/0422
See application file for complete search history.

(56) References Cited

U.S. PATENT DOCUMENTS

| | | | |
|---|---|---|---|
| 3,566,717 A | 3/1971 | Berman et al. | |
| 7,220,199 B2 * | 5/2007 | Anthoine | ........... F16H 3/728 475/5 |

(Continued)

FOREIGN PATENT DOCUMENTS

| | | |
|---|---|---|
| CN | 103213490-X A | 7/2013 |
| CN | 103072472-X | 12/2015 |

(Continued)

OTHER PUBLICATIONS

NO seach report dated Mar. 14, 2019.
ISR WOISA of Oct. 30, 2020.

*Primary Examiner* — Tisha D Lewis
(74) *Attorney, Agent, or Firm* — Christian D. Abel

(57) ABSTRACT

A powertrain comprising a transmission (2), a first electric motor (4*a*) and a second electric motor (4*b*), the transmission having an input shaft (1) to which a source of mechanical power may be connected, an output shaft (6) and a gear assembly providing at least two different gear ratios that may be selected for transfer of mechanical power from the input shaft (1) to the output shaft (6), the first electric motor (4*a*) is connected to the input shaft (1), such that torque and rotation may be transferred between the first electric motor and the input shaft, and the second electric motor (4*b*) is connected to the input shaft (1) via a first clutch (5*a*), such that torque and rotation may be transferred between the second electric motor (4*b*) and the input shaft (1), and connected to the output shaft (6) via a second clutch (5*b*), such that torque and rotation may be transferred between the second electric motor (4*b*) and the output shaft (6), wherein (Continued)

the first electric motor (4*a*) is connected to the second electric motor (4*b*) via the first clutch (5*a*).

21 Claims, 21 Drawing Sheets

(51) Int. Cl.
*F16H 61/04* (2006.01)
*B60K 6/442* (2007.10)

(56) References Cited

U.S. PATENT DOCUMENTS

| | | | | |
|---|---|---|---|---|
| 7,503,865 | B2* | 3/2009 | Pichon | B60K 6/365 |
| | | | | 475/5 |
| 7,582,033 | B2* | 9/2009 | Kefti-Cherif | B60W 20/20 |
| | | | | 475/5 |
| 8,142,319 | B2* | 3/2012 | Hiraki | B60K 17/10 |
| | | | | 475/75 |
| 2006/0189428 | A1 | 8/2006 | Raghavan et al. | |
| 2008/0182693 | A1 | 7/2008 | Holmes | |
| 2008/0182694 | A1 | 7/2008 | Holmes | |
| 2009/0084653 | A1 | 4/2009 | Holmes | |
| 2011/0059824 | A1* | 3/2011 | Buannec | F16H 3/728 |
| | | | | 475/303 |
| 2013/0345019 | A1 | 12/2013 | Kaltenbach et al. | |
| 2017/0102059 | A1* | 4/2017 | Rekow | B60K 6/365 |
| 2019/0337376 | A1* | 11/2019 | Ore | B60K 6/365 |

FOREIGN PATENT DOCUMENTS

| | | |
|---|---|---|
| DE | 102011005451-X A | 9/2012 |
| DE | 102015206190-X | 10/2016 |
| EP | 1286082 A | 2/2003 |

* cited by examiner

POWERTRAIN, VEHICLE AND METHOD OF PERFORMING A GEARSHIFT IN THE POWERTRAIN

FIELD OF THE INVENTION

The present invention relates to hybrid and electric powertrains for vehicles.

BACKGROUND

The present invention provides a new and improved electric or hybrid transmission/powertrain system.

There are many types of hybrid and electric powertrain systems. The two main types of hybrid systems are commonly termed parallel and serial hybrid systems.

A simple version of the parallel hybrid system is a powertrain, wherein an electric motor is placed on one wheel-driving axle of a vehicle and an internal combustion engine (ICE) with transmission is placed on another wheel-driving axle of the vehicle. In another type of parallel hybrid powertrain an electric motor is attached to or integrated in the main gearbox.

For cars, buses and trucks, hybrid systems are commonly made by using a transmission type that is a variant of the automatic transmission already used in a purely ICE-driven version of that vehicle type.

For cars there are historically two main types of transmissions. Automatic and manual transmissions. Both types are combined with an internal combustion engine (ICE), typically a gasoline or diesel engine. The old technology used in the automatic transmission is a planetary gear with multiple clutches that make combinations of the planetary gear ratios for the wanted gear ratio. This is combined with a start-up clutch that is a hydraulic torque converter. Usually this transmission is the type which is referred to as an automatic transmission (AT). The manual transmission is a so called lay shaft transmissions where gear wheels are placed at two parallel shafts. The start-up clutch or main clutch 3 is typically a frictional type of clutch and the gear ratios ($i_1$, $i_2$ . . . ) are usually engaged mechanically and only one at the same time. The torque in the gearbox will have to be zero at every gearshift and this also make the gearshift slow. This is a huge disadvantage for comfort, performance, emission control and fuel economy.

A block diagram illustrating a typical powertrain featuring an ICE, a main friction type clutch 3 and a generic transmission 2 is illustrated in FIG. 1.

A schematic drawing of a powertrain featuring a generic transmission 2, having a layshaft 7, as commonly used in heavy duty commercial trucks is illustrated in FIG. 2. The powertrain features a friction type clutch 3 arranged between the transmission 2 and an ICE. The illustrated transmission has two split gears (2c), three forward gears and one reverse gear in the main section (2a) of the transmission 2 (or gearbox). At the output shaft (6) there is two range gears (2b). This gives a total number of gears 2×3×2=12 forward gears (and 4 reverse gears). A lot of variants of this type of transmissions exists with less or more gears. Further, different modules can be attached in both front and rear of these types of transmissions. Typical modules are additional creep gears at the input side and an additional brake for long downhill braking called a retarder (Voith brand) can be attached at the output side.

For trucks, the most common automatic transmission is a manual transmission, e.g. the transmission 2 in FIG. 2, that is made automatic by use of electronically controlled actuators to operate clutches and gears instead of a manual clutch pedal and manual gear levers. This provides a very energy efficient and cost optimal transmission. This type of transmission is usually termed an automated manual transmission (AMT), also in the cases where the transmission has been optimised for this use and the internal parts are not used for any manual operation any more. Presently, the AMT is the most common transmission in the market for the largest trucks. A disadvantage of the AMT is that the torque at the drive wheels will go to zero each time a change of gear is done. This is a major disadvantage for both comfort and acceleration performance (lost time for acceleration). Furthermore, the loss of torque is also a challenge for control of the ICE to meet emission standards during gear shift. A typical prior art AMT is disclosed in for instance U.S. Pat. No. 8,571,772 B2.

In the last 20 years a type of AT with two main clutches and gears on separate shafts (similar to the manual transmission) have also gained popularity, see FIG. 3. This type of AT is usually termed a twin clutch transmission, dual clutch transmission or Double Shift Gearbox (DSG). This transmission can alternatively shift between the two parallel gear sets to transfer the torque to the driven wheels (the wheels illustrated as a double circle). This gives the opportunity to have continuous torque transfer during gearshifts. To obtain what is essentially two gearboxes in one unit this transmission type is quite expensive and mechanically complex.

A typical prior art parallel hybrid system features an electric motor E attached to the main input shaft 1 of the transmission of any of the known AT, DSG or AMT systems, see FIG. 4. The addition of the electric motor E does not alleviate any of the disadvantages inherent in the respective type of transmission. In these prior art systems, the electric motor is designed to run with a similar rotational speed as the ICE. A prior art parallel hybrid system featuring an AMT is disclosed in WO 2007/102762 A1.

In some prior art hybrid powertrains, see FIG. 5, the electric motor E is attached in parallel with the transmission 2 and has the possibility of being geared by ratio $i_x$ to a more cost optimal design than the solution in FIG. 4. A prior art hybrid powertrain featuring such an arrangement is disclosed in US 2002/0082134 A1. In US 2002/0082134 A1 the electric motor may be operatively connected to either or both the input and output shaft of a transmission. The hybrid powertrain disclosed in US 2002/0082134 A1 is not optimal. For instance, it may not be run as a serial hybrid during gearshift and this reduces the overall efficiency as well as increases the clutch wear. Further, it is not possible to use the electric motor E actively to establish zero torque at the input shaft, as required to disengage/engage gear, nor may the electric motor accelerate the input shaft faster than the ICE.

A prior art transmission for reducing some of the torque interrupt in AMT transmissions is described in US 2004/0138800 A1. A variant of this transmission having an electric motor for a hybrid drive is described in US 2002/0082134 A1. These transmissions are known as feasible to make and control but have challenges in that the torque level transferred to the output shaft during gearshift is too low and/or that the wear in the clutch or clutches used during the gear shift is high.

Presently we see a large trend of electrification in the automotive industry. This is driven both by fuel economy, legislation, incentives, environmental motivation and the technological breakthrough in battery, fuel cell and other related technology.

The goal of the present invention is to provide an improved powertrain system in which at least some of the disadvantages of the prior art powertrain systems are avoided or alleviated.

SUMMARY OF THE INVENTION

The present invention is defined by the appended claims and in the following:

In a first aspect, the present invention provides a powertrain comprising a transmission, a first electric motor and a second electric motor, wherein
the transmission comprises an input shaft to which a source of mechanical power may be connected, an output shaft and a gear assembly providing at least two different gear ratios that may be selected for transfer of mechanical power from the input shaft to the output shaft,
the first electric motor is connected to the input shaft, such that torque and rotation may be transferred between the first electric motor and the input shaft, and
the second electric motor is connected to the input shaft via a first clutch, such that torque and rotation may be transferred between the second electric motor and the input shaft, and connected to the output shaft via a second clutch, such that torque and rotation may be transferred between the second electric motor and the output shaft, wherein
the first electric motor is connected to the second electric motor via the first clutch.

In other words, the first clutch is connected to the input shaft via the first electric motor.

In other words, the first electric motor is connected to the second electric motor via the first clutch, such that torque and rotation may be transferred between the first and second electric motor via the first clutch.

In other words, the second electric motor is connected to the input shaft via a first clutch, such that torque and rotation may be transferred between the second electric motor and the input shaft via the first clutch, and connected to the output shaft via a second clutch, such that torque and rotation may be transferred between the second electric motor and the output shaft via the second clutch.

In other words, the first electric motor, the second electric motor, the first clutch and the second clutch are interconnected, such that torque and rotation may be transferred between the input shaft and the output shaft via the first electric motor, the second electric motor, the first clutch and the second clutch.

The term «mechanical power» is intended to mean torque and rotation.

The terms "connected to the input shaft" and "connected to the output shaft" are intended to define any direct or indirect connection which allows for the transfer of torque and rotation to/from the input shaft and the output shaft, respectively. In other words, the terms may also be defined as "operatively connected to the input shaft" and "operatively connected to the output shaft".

The first aspect may alternatively be defined as a powertrain comprising a transmission, a first electric motor and a second electric motor, wherein
the transmission comprises a section comprising an input shaft (or input side) to which a source of mechanical power may be connected, an output shaft (or output side) and at least two different gears that may be selected for transfer of mechanical power from the input shaft to the output shaft,
the first electric motor is connected to the input shaft, such that torque and rotation may be transferred between the first electric motor and the input shaft, and
the second electric motor is connected to the input shaft via a first clutch, such that torque and rotation may be transferred between the second electric motor and the input shaft and connected to the output shaft via a second clutch, such that torque and rotation may be transferred between the second electric motor and the output shaft.

In an embodiment of the powertrain according to the invention, the first electric motor is electrically connected to the second electric motor, such that the first electric motor may generate electric power from torque at the input shaft and transfer the generated electric power to the second electric motor. In other words, the first electric motor is electrically connected to the second electric motor, such that the torque output of the second electric motor may be boosted by electric power generated by the first electric motor. Preferably, the first electric motor is electrically connected to the second electric motor, such that electric power generated in the first electric motor may be directly transferred to the second electric motor, i.e. the generated electric power does not pass through a battery being common for the first and the second electric motor.

In other words, the first electric motor may function as a generator to generate electric power from torque in the input shaft.

In an embodiment of the powertrain according to the invention, the first electric motor, the second electric motor, the first clutch and the second clutch form parts of a torque transfer path bypassing (in other words being parallel to) the at least two different gears, the torque transfer path arranged to transfer torque from the input shaft to the output shaft during a gearshift ((i.e. during a shift between the at least two different gears of the transmission).

In an embodiment, the powertrain according to the invention features a torque transfer path bypassing (or being parallel to) the at least two different gears, the torque transfer path comprises the first electric motor, the second electric motor, the first clutch and the second clutch, and may transfer torque from the input shaft to the output shaft during a gearshift (i.e. during a shift between the at least two different gears of the transmission).

In an embodiment of the powertrain according to the invention, the source of mechanical power is an internal combustion engine or at least one electric motor.

In an embodiment of the powertrain according to the invention, the at least one electric motor is preferably the first electric motor, optionally combined with the second electric motor.

In an embodiment of the powertrain according to the invention, the first electric motor is connected to the input shaft via a third clutch.

In an embodiment of the powertrain according to the invention, the source of mechanical power is an internal combustion engine (ICE), the ICE connected to the transmission input via a main clutch.

In an embodiment of the powertrain according to the invention, the first electric motor is connected to the input shaft via a first gear and the second electric motor is connected to the output shaft via a second gear.

In an embodiment of the powertrain according to the invention, the first clutch and the second clutch are connected to a first actuator and a second actuator, respectively, and the first and the second actuator are electronically controlled. The first and second actuator are connected to an electronic control system providing the optimum or required level of torque to the input shaft and/or the output shaft during a gearshift. The electronic control system may also be connected to gearshift actuators in the transmission.

In an embodiment of the powertrain according to the invention, any of the first clutch, the second clutch, the third clutch and the main clutch may operate with a torque level controllable between zero and a maximum torque level. The clutches may preferably be friction clutches. At least one of the clutches may be of a type that can increase the torque by speed difference over the clutch.

In an embodiment, the powertrain according to the invention comprises an electric power supply connected to the first and the second electric motor. The power supply may be an electric battery, an electric capacitor, a fuel cell or any combination thereof.

In an embodiment, the powertrain according to the invention comprises drive wheels to which the output shaft is connected.

In an embodiment of the powertrain according to the invention, the transmission features at least a section comprising a layshaft transmission.

In an embodiment of the powertrain according to the invention, any of the first and second electric motor is connected to the input shaft or the output shaft via a layshaft of the layshaft transmission.

In an embodiment of the powertrain according to the invention, any of the first and second electric motor is connected to the input shaft or the output shaft via a gear in the transmission.

In an embodiment of the powertrain according to the invention, the torque in the first electric motor and the first clutch, as well as the second electric motor and the second clutch, may be controlled by a central control unit.

In a second aspect, the present invention provides a vehicle comprising a powertrain according to the first aspect.

In a third aspect, the present invention provides a method of performing a gearshift from a low gear to a high gear in a powertrain according to the first aspect, comprising the steps of:
  a. controlling the torque in the first electric motor and the first clutch to be equal to the torque in the main clutch.
  b. transferring torque to the output shaft by engaging the second clutch;
  c. disengaging the low gear;
  d. reducing the rotational speed of the input shaft by having a higher torque in the first electric motor 4a and the first clutch 5a than in the main clutch 3; and
  e. engaging the high gear when the rotational speed of the input shaft is synchronous with the high gear and the torque in the first electric motor and the first clutch is equal to the torque in the main clutch.

In other words, step a entails controlling the resultant or combined torque provided by the first electric motor and the first clutch to the input shaft. In step a, the first clutch is at least slipping, i.e. is not fully closed.

The torque in the first electric motor and the first clutch may be controlled by operating the first clutch and/or by controlling the power supplied to the first electric motor.

With respect to step d, it is noted that the torque in the second clutch will typically be higher than in the first clutch due to torque from the second electric motor, and the kinetic energy in the second electric motor is used when reducing the rotational speed of the input shaft.

Performing a gearshift from a low gear to a high gear in a powertrain according to the first aspect entails shifting between the at least two different gear ratios of the gear assembly.

A powertrain according to the first aspect may be defined as comprising driven wheels operatively connected to the output shaft, and step b may be defined as transferring torque to the driven wheels by engaging the second clutch.

In an embodiment, the method according to the third aspect comprises a step of establishing a required torque in the input shaft by any combination of the first electric motor, the second electric motor and the ICE after the high gear is engaged. In other words, a required torque is established in the input shaft by providing torque to the input shaft from any combination of the first electric motor, the second electric motor and the ICE after the high gear is engaged.

In an embodiment of the method according to the third aspect, the required torque is obtained by establishing the full torque from the ICE in the main clutch 3.

In an embodiment of the method according to the third aspect, step a is preceded by a step of driving the input shaft by any of the first electric motor, the second electric motor and the ICE, wherein any of the first and second clutch is open or closed.

In an embodiment of the method according to the third aspect, step a is preceded by a step of driving the output shaft by the first electric motor and/or the second electric motor, wherein the first clutch is open or closed and the second clutch is closed.

In an embodiment of the method according to the third aspect, step a is preceded by a step of running the first and second electric motors rotationally engaged with the input shaft of the transmission, wherein the first clutch is closed, and the second clutch is open.

In an embodiment of the method according to the third aspect, step a is preceded by a step of running the ICE rotationally engaged with the input shaft of the transmission via the main clutch.

The term "closed" and "open" may optionally be replaced by the terms "disengaged" and "engaged", respectively. When engaged the first and second clutch transfer torque up to a maximum torque.

In a fourth aspect, the present invention provides method of performing a gearshift from a low gear to a high gear in a powertrain according to the first aspect comprising the steps of:
  a. controlling the torque in the first electric motor and the first clutch to be equal to the torque in the input shaft;
  b. transferring torque to the output shaft by engaging the second clutch;
  c. disengaging the low gear;
  d. reducing the rotational speed of the input shaft by having a higher torque in the first electric motor 4a and the first clutch than in the input shaft; and
  e. engaging the high gear when the rotational speed of the input shaft is synchronous with the high gear and the torque in the first electric motor and the first clutch is equal to the torque in the input shaft.

In other words, step a entails controlling the resultant or combined torque provided by the first electric motor and the first clutch to the input shaft. In step a, the first clutch is at least slipping, i.e. is not fully closed.

The torque in the first electric motor and the first clutch may be controlled by operating the first clutch and/or by controlling the power supplied to the first electric motor.

In an embodiment, the method according to the fourth aspect comprises a step of disengaging the second clutch and transferring torque from the second electric motor to the input shaft following the step of engaging the high gear. In other words, following the step of engaging the high gear, the first electric motor, the second electric motor, the first clutch and the second clutch are controlled, e.g. by a central control unit, to obtain a required torque in the input shaft.

In an embodiment of the method according to the fourth aspect, step a is preceded by a step of driving the input shaft by any of the first electric motor and the second electric motor, wherein any of the first and second clutch is open or closed.

In an embodiment of the method according to the fourth aspect, step a is preceded by a step of running the first and second electric motors rotationally engaged with the input shaft of the transmission, wherein the first clutch is closed, and the second clutch is open.

In a fifth aspect, the present invention provides a method of performing a gearshift from a high gear to a low gear in a powertrain according to the first aspect, comprising the steps of:
  a. controlling the torque in the first electric motor (4a) and the first clutch (5a) to be equal to the torque in the main clutch (3);
  b. transferring torque to the output shaft (6) by engaging the second clutch 5b;
  c. disengaging the high gear;
  d. increasing the input shaft (1) rpm by having a higher torque in the first electric motor (4a) and the first clutch (5a) than in the main clutch (3); and
  e. engaging the low gear when the input shaft (1) speed is synchronous with the low gear and the torque in the first electric motor (4a) and the first clutch (5a) is controlled to be equal to the torque in the main clutch (3).

In other words, step a entails controlling the resultant or combined torque provided by the first electric motor and the first clutch to the input shaft. In step a, the first clutch is at least slipping, i.e. is not fully closed.

The torque in the first electric motor and the first clutch may be controlled by operating the first clutch and/or by controlling the power supplied to the first electric motor.

Performing a gearshift from a low gear to a high gear in a powertrain according to the first aspect entails shifting between the at least two different gear ratios of the gear assembly.

A powertrain according to the first aspect may be defined as comprising driven wheels operatively connected to the output shaft, and step b may be defined as transferring torque to the driven wheels by engaging the second clutch. In an embodiment, the engaged second clutch is slipping. An engaged clutch which is slipping may transfer maximum torque or less but does not transfer the maximum of rotational speed (rpm).

In step d of the method according to the fifth aspect, the main clutch is slipping. It is noted that the inventive powertrain has a significant advantageous effect in the fact that the second electric motor may provide a negative torque at the output shaft while the first electric motor may quickly accelerate the input shaft to the desired rpm and in this manner making the gearshift as fast as possible.

In an embodiment, the method according to the fifth aspect comprises a step of establishing a required torque in the input shaft by any combination of the first electric motor, the second electric motor and the ICE after the low gear is engaged. In other words, a required torque is established in the input shaft by providing torque to the input shaft from any combination of the first electric motor, the second electric motor and the ICE after the low gear is engaged.

In an embodiment of the method according to the fifth aspect, the required torque is obtained by establishing the full torque from the ICE in the main clutch.

In an embodiment of the method according to the fifth aspect, step a is preceded by a step of driving the input shaft by any of the first electric motor, the second electric motor and the ICE, wherein any of the first and second clutch is open or closed.

In an embodiment of the method according to the fifth aspect, step a is preceded by a step of running the first and second electric motors rotationally engaged with the input shaft of the transmission, wherein the first clutch is closed, and the second clutch is open.

In an embodiment of the method according to the fifth aspect, step a is preceded by a step of running the ICE rotationally engaged with the input shaft of the transmission via the main clutch.

In a sixth aspect, the present invention provides a method of performing a gearshift from a high gear to a low gear in a powertrain according to the first aspect, comprising the steps of:
  a. controlling the torque in the first electric motor and the first clutch to be equal to the torque in the input shaft;
  b. transferring torque to the output shaft by engaging the second clutch;
  c. disengaging the high gear;
  d. increasing the input shaft rpm (i.e. rotational speed, revolutions per minute) by having a higher torque in the first electric motor and the first clutch than in the input shaft; and
  e. engaging the low gear when the input shaft rpm is synchronous with the low gear and the torque in the first electric motor and the first clutch is controlled to be equal to the torque in the input shaft.

In other words, step a entails controlling the resultant or combined torque provided by the first electric motor and the first clutch to the input shaft. In step a, the first clutch is at least slipping.

The torque in the first electric motor and the first clutch may be controlled by operating the first clutch and/or by controlling the power supplied to the first electric motor.

Performing a gearshift from a low gear to a high gear in a powertrain according to the first aspect entails shifting between the at least two different gear ratios of the gear assembly.

A powertrain according to the first aspect may be defined as comprising driven wheels operatively connected to the output shaft, and step b may be defined as transferring torque to the driven wheels by engaging the second clutch. In an embodiment, the engaged second clutch is slipping, i.e. does not transfer maximum possible torque.

It is noted that the inventive powertrain has a significant advantageous effect in the fact that the second electric motor may provide a negative torque at the output shaft while the first electric motor may quickly accelerate the input shaft to the desired rpm and in this manner making the gearshift as fast as possible.

In an embodiment, the method according to the sixth aspect comprises a step of establishing a required torque in the input shaft by any combination of the first electric motor and the second electric motor after the low gear is engaged. In other words, a required torque is established in the input shaft by providing torque to the input shaft from any combination of the first electric motor and the second electric motor after the low gear is engaged.

In an embodiment of the method according to the sixth aspect, step a is preceded by a step of driving the input shaft by any of the first electric motor and the second electric motor, wherein any of the first and second clutch is open or closed.

In an embodiment of the method according to the sixth aspect, step a is preceded by a step of running the first and second electric motors rotationally engaged with the input shaft of the transmission, wherein the first clutch is closed, and the second clutch is open.

In an embodiment, the method according to the sixth aspect comprises a step of disengaging the second clutch and transferring torque from the second electric motor to the input shaft following the step of engaging the low gear.

In a seventh aspect, the present invention provides a method of transferring torque in a powertrain according to the first aspect, comprising the steps of:
- disengaging the first clutch and engaging the second clutch;
- transferring torque from the input shaft to the first electric motor and having the first electric motor running as a generator;
- transferring electric power generated by the first electric motor to the second electric motor;
- generating torque in the second electric motor by use of the electric power transferred from the first electric motor; and
- transferring the torque generated in the second electric motor to the output shaft.

In some embodiments of the method according to the seventh aspect, the step of generating torque in the second electric motor by use of the electric power transferred from the first electric motor may be defined as boosting the torque in the second electric motor by use of the electric power transferred from the first electric motor.

By transferring the electric power generated in the first electric motor to the second electric motor, the torque from the second electric motor may advantageously be boosted for a short time in a highly energy efficient manner.

In an eight aspect, the present invention provides a method of obtaining maximum torque at the output shaft of a powertrain according to the first aspect, comprising the step of:
- running the first electric motor 4a and the second electric motor 4b at maximum torque in the same rotational direction, while having both the first clutch 5a and the second clutch 5b engaged. The first and the second clutches are transferring maximum torque but may have a controlled slip.

In an embodiment of the eight aspect, the powertrain features an ICE connected to the input shaft via a main clutch, and the method comprises a step of:
- running the ICE to provide torque in the same rotational direction as the torque from the first electric motor and the second electric motor, while having the main clutch engaged. The main clutch is preferably transferring maximum torque but may have a controlled slip.

In an embodiment of the eight aspect, the ICE provides its maximum torque.

In an embodiment of the eight aspect, the method is performed during a gearshift, preferably during and/or after a step of disengaging a high or low gear in the transmission, i.e. during a shift of gear ratio.

The methods according to the third to sixth aspect may comprise steps as defined above wherein a required torque is established in the input shaft. The required torque will normally be calculated as a result of a high-level torque input to a transmission controller or central control unit (e.g. the driver by pedal, the cruise control, traction control or other high-level controls). From the transmission controller, the motors in the powertrain may be controlled to give the required torque to the input shaft, i.e. the required torque is calculated by the transmission controller based on the torque or rpm which is needed in the output shaft.

DESCRIPTION OF THE DRAWINGS

Embodiments of the invention is described in detail by reference to the following drawings.

DETAILED DESCRIPTION OF EMBODIMENTS OF THE INVENTION

Based on the prior art described in the background section and shown in FIGS. 1-5, the applicant has developed a highly advantageous powertrain which is described in more detail by reference to FIGS. 6-21. Identical or similar technical features have been provided with the same reference number throughout the application.

Figure 6:
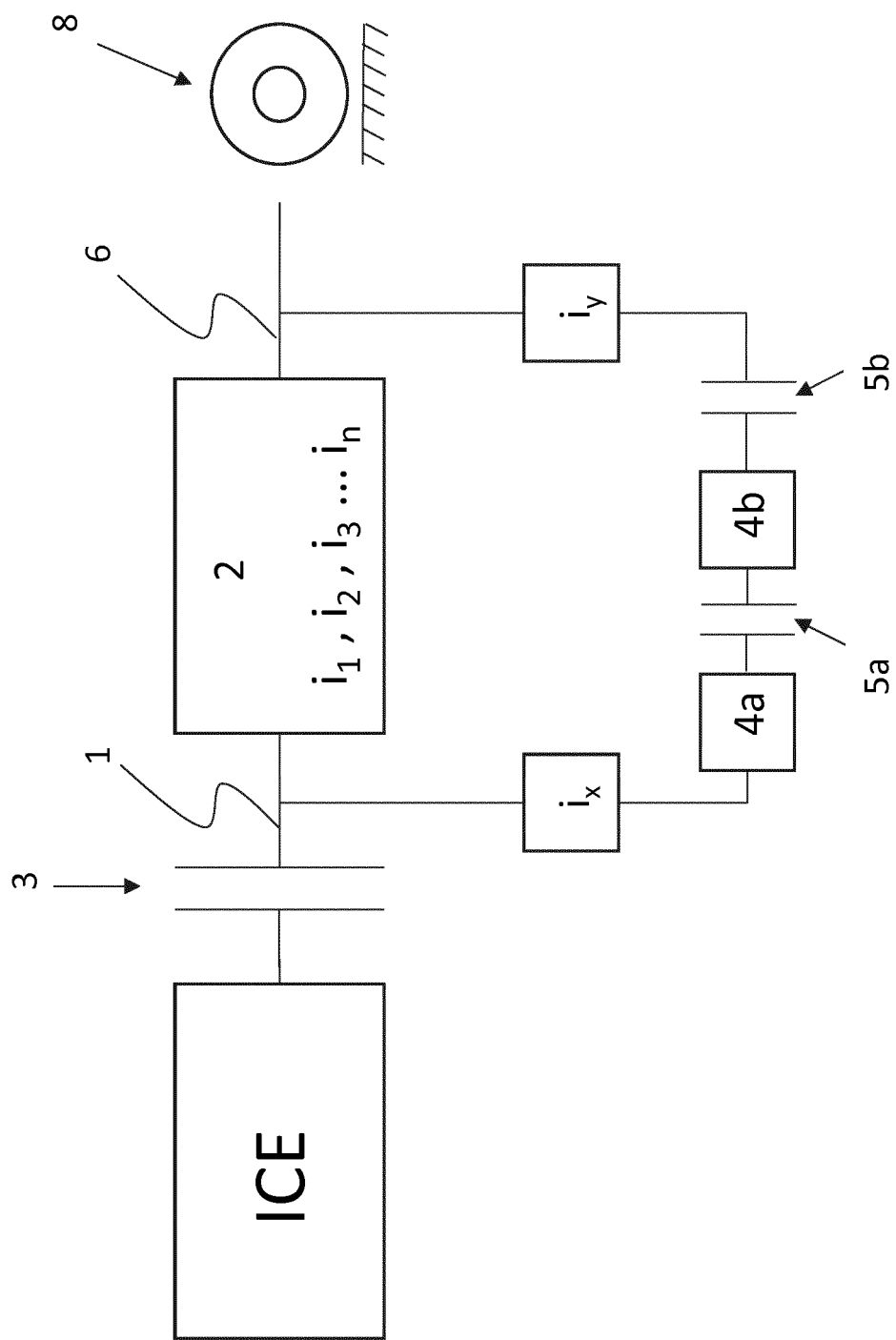
FIG. 6 is a block diagram of an exemplary powertrain according to the invention.

An embodiment of a hybrid powertrain according to the invention is shown by use of a block diagram in FIG. 6. The powertrain comprises an ICE connected to an input shaft 1 (or input side) of a transmission 2 (or gearbox) via a main clutch 3, a first electric motor 4a, a second electric motor 4b, a first clutch 5a and a second clutch 5b. The first electric motor 4a is operatively connected to the input shaft 1, preferably via at least one gear $i_x$ (a first gear), and operatively connected to the second electric motor 4b via the first clutch 5a. The second electric motor 4b is operatively connected to an output shaft 6 (or output side) of the transmission 2 via the second clutch 5b and at least one gear $i_y$ (or a second gear) and to the input shaft 1 via the first clutch 5a. The arrangement of the electric motors 4a,4b and the first and second clutch 5a,5b ensures that torque may be transferred in a flexible and controllable manner between the input shaft and the output shaft. In other words, the electric motors 4a,4b and the first and second clutch 5a,5b form part of a torque transfer path able to transfer torque and rotation between the input shaft 1 and the output shaft 6 of the transmission. The detailed construction of the torque transfer path may vary depending on the type of transmission and space requirements. In addition to having at least two gear shifts (i.e. a gear assembly providing at least two gear shifts) in the transmission 2, the inventive powertrain may comprise any suitable additional gears such as creep gears and split gears. Additional gears may be comprised by the transmission 2 or be connected to the input shaft or output shaft of the transmission 2. See for instance FIG. 8 for an embodiment wherein the transmission 2 is made up of a main part 2a, creep gears 2b and split gears 2c.

The combination of having two electric motors 4a,4b interconnected via clutches 5a,5b as shown in FIG. 6 provides several advantageous effects. A main advantage is the possibility of transferring torque during a gearshift. Further, the disclosed combination of two clutches and two electric motors provides a significantly increased torque transfer performance by using the rotational kinetic energy in the system during the gearshifts. Although not shown in FIG. 6, the inventive powertrain comprises an electric power source, such as a battery, arranged to provide electric power to any of the two electric motors 4a,4b when required, as well as storing electric power received from any of the two electric motors when used as generators. Additionally, the first electric motor 4a may be electrically connected to the second electric motor 4b, such that electric power generated in the first electric motor 4a, when it is used as a generator, may be transferred to the second electric motor 4b. In a preferred embodiment, the first electric motor 4a is electrically connected to the second electric motor 4b, such that electric power generated in the first electric motor 4a, may be transferred directly to the second electric motor 4b, i.e. without passing through a common power supply (not shown). The latter feature is highly advantageous in that it is highly energy efficient.

A further advantage of the inventive powertrain is that expensive brakes and/or components for synchronizing the input shaft speed during gear shifts are not required since the synchronizing may be handled by at least the first electric motor 4a, optionally in combination with the first clutch 5a.

During an upwards shift of gear ratio, the two electric motors 4a,4b will use its peak power performance only available in shorter time periods to compensate for the loss of torque at the output shaft 6. The torque transfer path extends between the input shaft 1 and the output shaft 6 and may transfer torque over the two clutches 5a,5b. In addition to, or instead of, transferring torque/mechanical power from the input shaft 1 over the first clutch 5a, the first electric motor 4a may receive torque/mechanical power from the input shaft 1 and supply electric power to the second electric motor 4b which in turn will supply torque/mechanical power to the output shaft 6 (and consequently to the driven wheels 8) through the second clutch 5b during a gearshift. In addition to, or instead of, electric power generated by the first electric motor 4a, the torque from the second electric motor 4b to the driven wheels 8 may be boosted by electric power from a battery or other electric power source.

In an electric drive situation, i.e. only the electric motors are used to drive a vehicle, the most common situation will be that the first clutch 5a is fully engaged to transfer torque and the second clutch 5b is fully open, i.e. does not transfer any torque.

The present invention requires the use of two separate electric motors, i.e. a first electric motor 4a and a second electric motor 4b, which in combination provides a required torque/mechanical power. It may seem counter-intuitive that the use of two electric motors may be cost-efficient as opposed to a single electric motor, but the cost of an electric motor having a size suitable for electric drive is substantially proportional with the torque and mechanical power of the motor. Consequently, the difference in cost for electrically generated torque/mechanical power obtained by using a single large electric motor or a combination of two smaller electric motors is minor.

Although the cost difference between the use of a single large electric motor vs. two smaller electric motors is minor, in terms of functionality there are major differences. The inventive combination of two electric motors may to a large extent function as a mechanical gearbox by transforming a lower torque at high rpm (rotational speed) to a higher torque at a lower rpm. Since the electric motors may perform with a much higher mechanical power output in short time periods this performance fits very well with the need during a gear shift which occurs over a relatively short time, typically less than 2-3 seconds.

Consequently, when used as a hybrid powertrain, the inventive powertrain will increase the performance of the transmission system since it makes it possible for the transmission (e.g. an AMT transmission) to transfer torque (between an input shaft/side to an output shaft/side) during gearshift. This is a highly advantageous feature as it allows for the best possible acceleration, keeping the speed during uphill driving, improved comfort, minimizing emissions during gearshifts and provides an overall improved efficiency. By using a combination of two electric motors in a hybrid powertrain the behaviour of the powertrain will be like what is only obtainable by powertrains featuring more complex and expensive transmission systems, such as AT or DSG. For trucks this means a significant increase in customer value. Further, the inventive powertrain may be constructed from standard AMT transmissions by adding the required electric motors and clutches as modules. The latter option may be an especially attractive solution for truck manufacturers. When used in cars, the inventive power train provides a substantially reduced component cost by not requiring an expensive transmission with torque transfer during shift of gear ratios.

The inventive powertrain may be configured as a powertrain that runs mostly in an ICE-driven mode to a system that may run predominantly, or only, in a purely electric mode depending on the customers' requirements for function and economy. In other words, the inventive powertrain may be configured as a hybrid system, featuring both an ICE and electric motors for providing motive power, and a pure electrical system, wherein all motive power is provided by electric motors.

There are a lot of different technologies for electric motors that are used for propulsion of electric vehicles. The inventive powertrain may use any of these commonly known electric motor technologies, i.e. any of DC Series Motors, Brushless DC Motors, Permanent Magnet Synchronous Motors (PMSM), Three Phase AC Induction Motors and Switched Reluctance Motors (SRM). The various types of electric motors may have different performance characteristics. By use of the inventive powertrain, an optimal combination of electric motors may be applied. For instance, some electric motor principles are known to have a very low torque at zero rotational speed, but with other favourable characteristics, such as high efficiency during operation. By use of the inventive powertrain, the type of electric motor may be optimized, e.g. in that the second electric motor 4*b* has a very low torque at zero rotational speed, but high efficiency during operation (i.e. at a defined rpm range above zero), while the first electric motor 4*a* may provide a high torque at zero rpm but is slightly less efficient during operation. Using the latter combination of electric motors, a vehicle starting in pure electric driving mode at zero speed with a low gear engaged in the transmission 2 would be able to run clutch 5*a* at a slipping rotational speed so both the first and the second electric motor 4*a*.4*b* could perform at its maximum torque to get the vehicle rolling.

The clutches 3,5*a*,5*b* used in the inventive powertrain may in many cases be any suitable type of friction clutches, wherein the transfer of torque is done by pushing at least two frictional surfaces against each other. However, the inventive powertrain may also comprise clutches according to other known clutch principles, such as:

Friction type clutches combined with centrifugal operation;
Clutches based on hydraulic principles (i.e. known as torque converter) where one rotating part sets another rotating part in rotation via a fluid (transmission oil);
Clutches having a mechanical connection for transferring rotation e.g. dog clutch.
Clutches where viscosity in a fluid is changed by heat or magnetic properties for transferring of torque, and
Any combinations of the above principles.

To obtain a compact design of the powertrain, use of friction type clutches with multiple clutch discs may be advantageous.

To control the torque in the inventive powertrain during a gearshift, the first electric motor 4*a*, the second electric motor 4*b*, the first clutch 5*a*, the second clutch 5*b* and optionally the main clutch 3 (depending on whether the powertrain features an ICE) are the components being the main focus for the control software and strategy. While the electric motors 4*a*,4*b* can change the torque incredibly quick in times as short as 20-30 ms the clutches 5*a*,5*b* will typically be relatively slow since the movement of the clutch discs and building up the pressure on the clutch discs takes time. The corresponding time to have a significant change in the torque through a friction type clutch may be about 100-200 ms. The quick torque change of the electric motors may be utilized in many of the gearshift processes/methods as disclosed below. The quick torque change is especially useful in the high positive torque upshift just after the low gear is disengaged, as described in method I below. This is the operation where the input shaft rotational speed is reduced and synchronized to a new higher gear. The method may briefly be described as first having the first electric motor 4*a* running with a high positive torque output and having the first clutch 5*a* transferring the torque from both the main clutch 3 and the first electric motor 4*a*. To quickly apply torque to reduce the input shaft rotational speed (rpm) the first electric motor 4*a* acts as quickly as possible in reducing and possibly going to negative torque to slow down the input shaft 1. The first clutch 5*a* will increase the torque as quickly as possible, but the application of the torque is significantly slower than for the first electric motor 4*a*.

Figure 7:
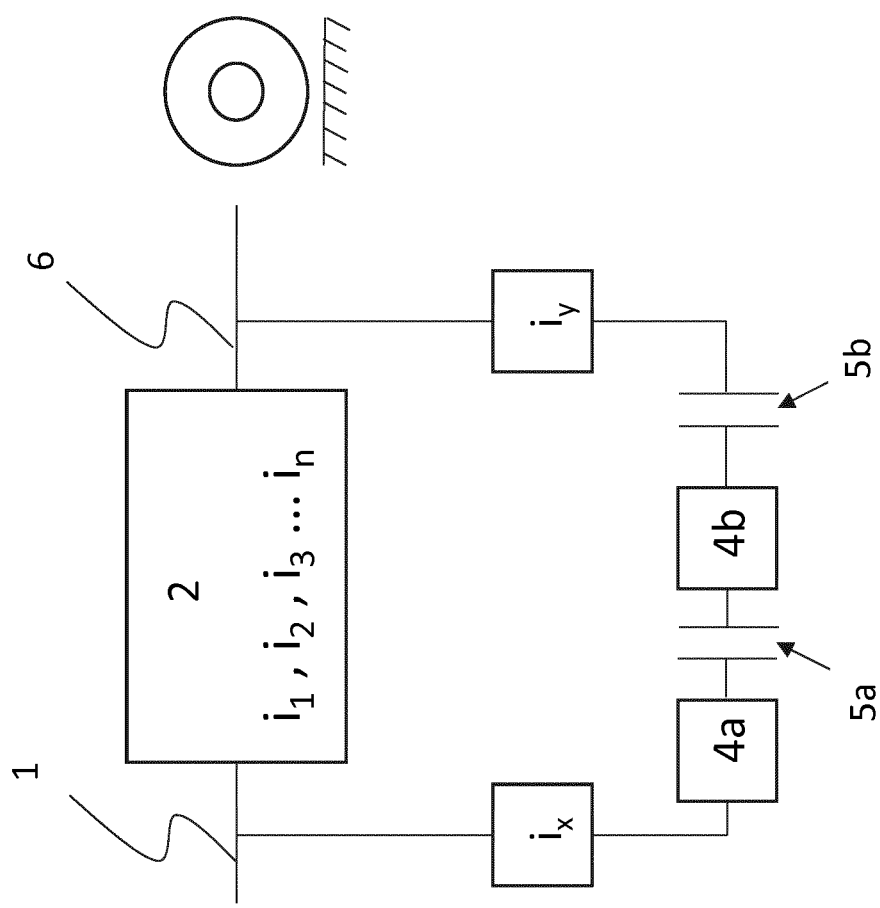
FIG. 7 is a block diagram of an exemplary powertrain of the invention wherein the powertrain is fully driven by electric motors, i.e. no ICE is connected to the powertrain.

A purely electrically driven powertrain according to the invention is shown as a block diagram in FIG. 7. As opposed to the hybrid powertrain in FIG. 6, the powertrain is fully driven by the electric motors 4*a*,4*b*, i.e. no internal combustion engine is connected to the powertrain. For fully electrically driven vehicles that will need to run longer periods in highway speed as well as longer periods at very low speed there are many cases where a transmission featuring at least two gear shifts will be an advantage. Similar to the embodiment in FIG. 6, the embodiment in FIG. 7 may shift gears without torque interrupt. In purely electrically driven powertrains, the at least two gear shifts will allow the optimization of the electric motors with respect to efficiency.

Figure 19:
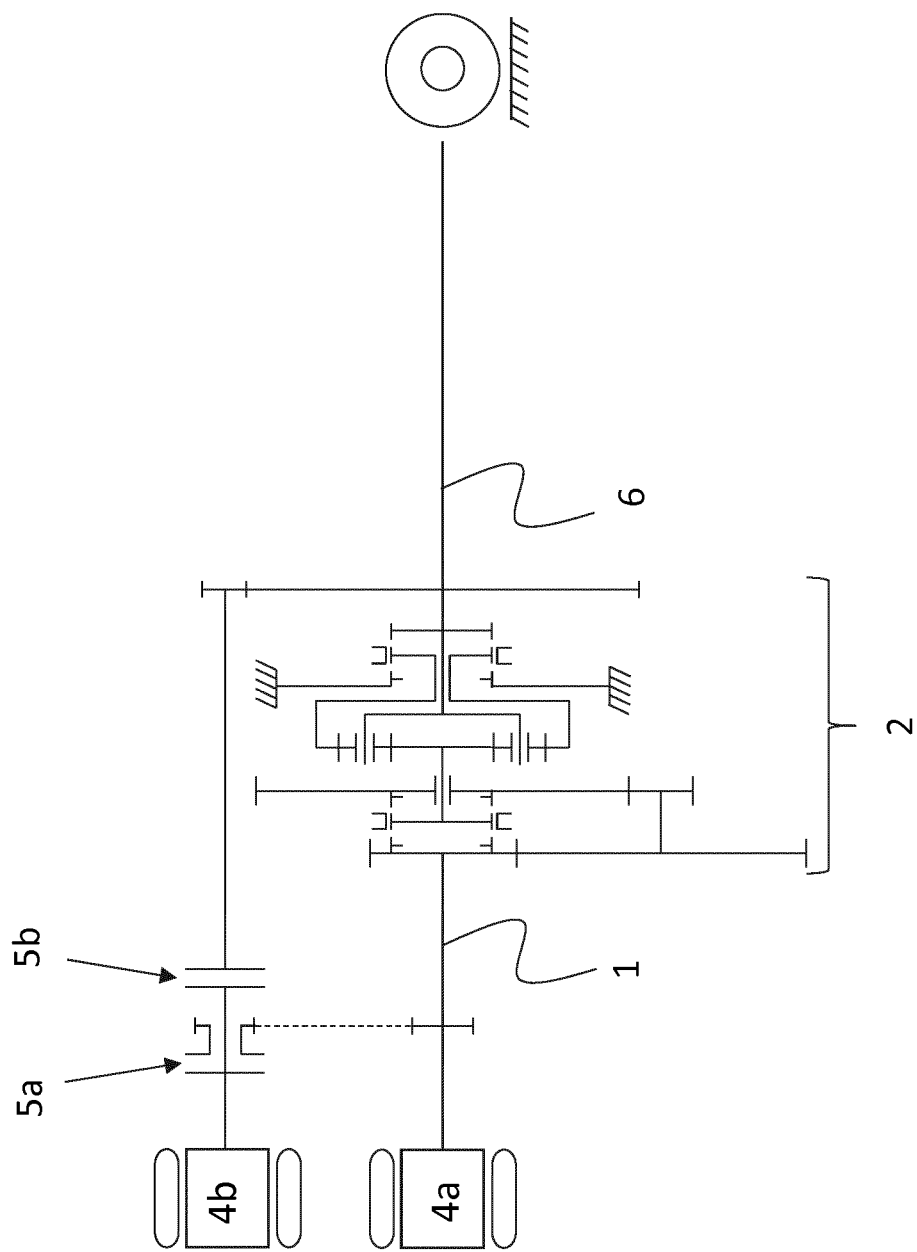
FIG. 19 is a detailed schematic drawing showing an exemplary powertrain according to the invention.

For simplicity, the present invention is in the following described by reference to powertrains featuring an ICE, i.e. hybrid powertrains. However, the features described in connection with the hybrid powertrains shown in FIGS. 8-16 may also be used in corresponding powertrains without an ICE and driven solely by the electric motors. Two exemplary powertrains for electric drive only are shown in FIGS. 17 and 19.

Figure 1:
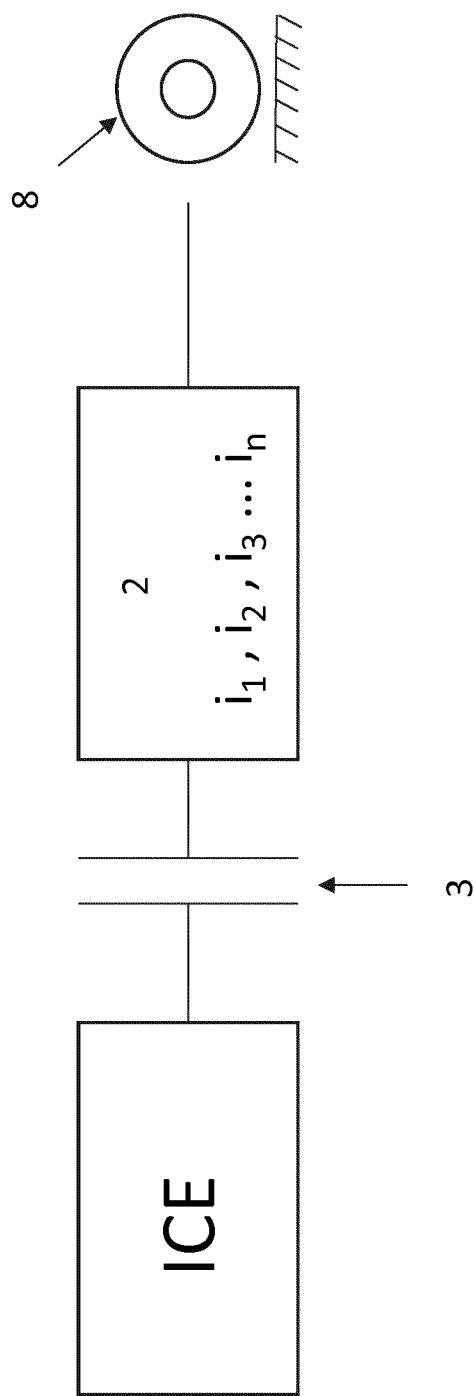
FIG. 1 is a block diagram of a prior art powertrain featuring a transmission.
Figure 2:
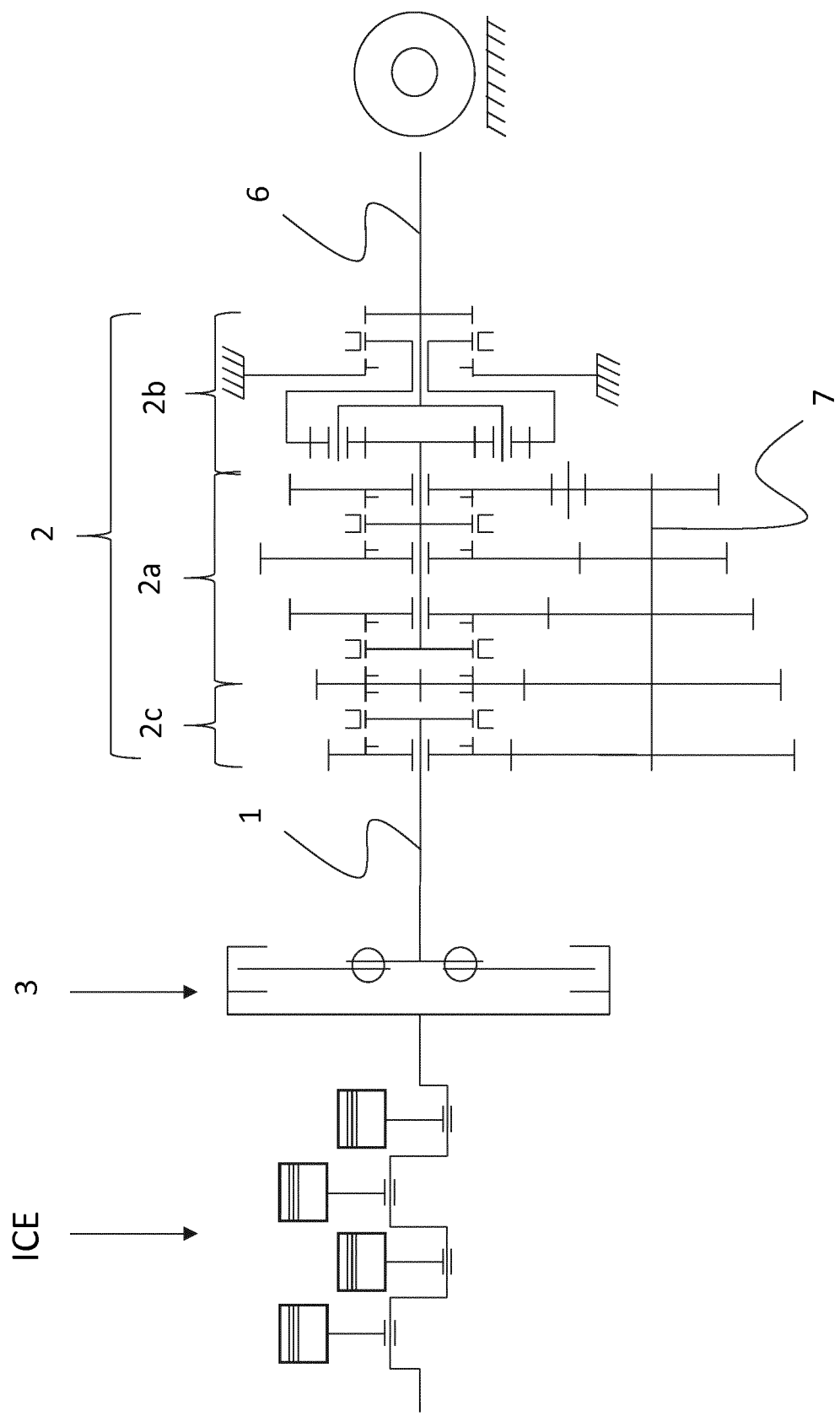
FIG. 2 is a detailed schematic drawing of a prior art powertrain as used in heavy duty commercial trucks.
Figure 3:
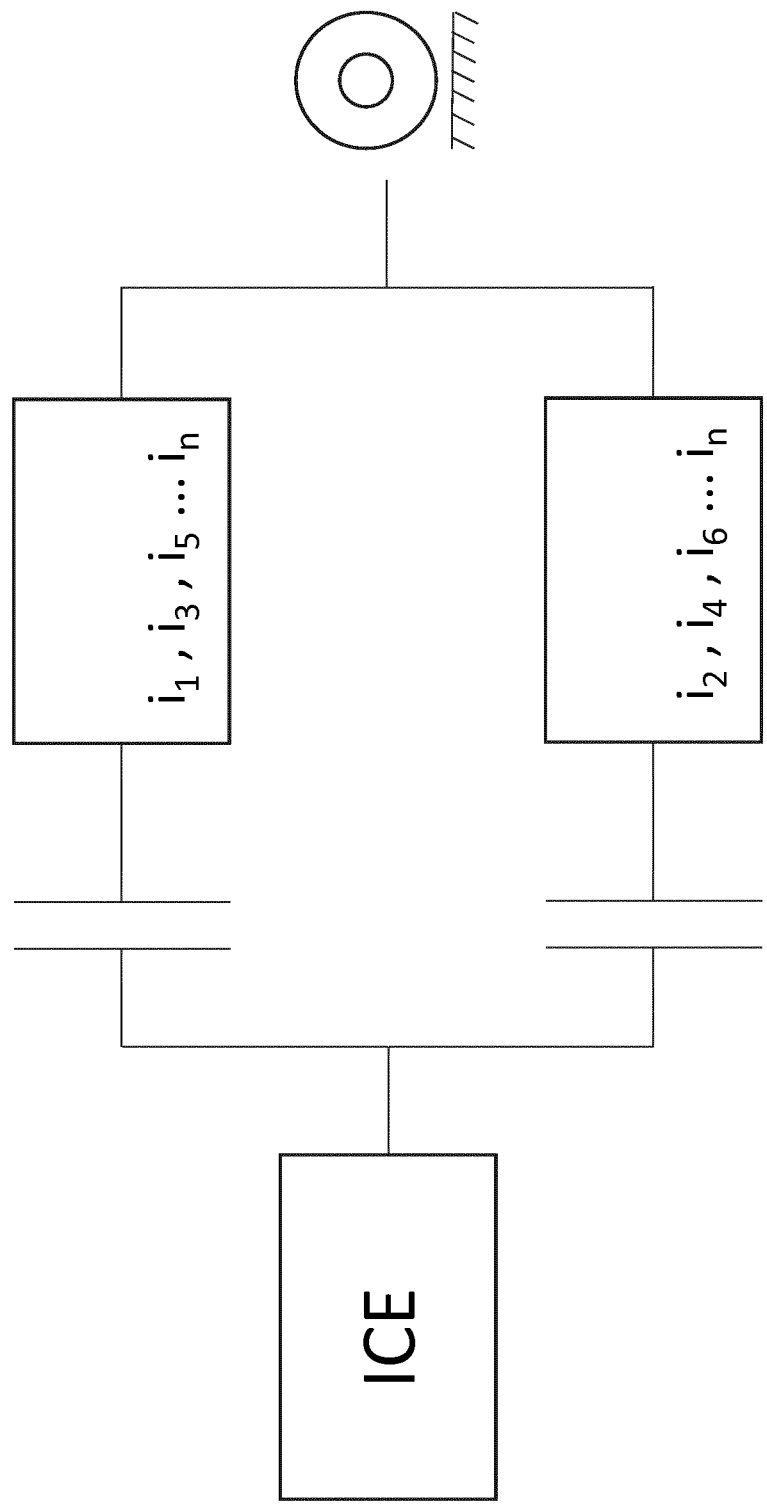
FIG. 3 is a block diagram of a powertrain featuring a prior art transmission system usually termed a twin clutch transmission, dual clutch transmission or Double Shift Gearbox (DSG).
Figure 4:
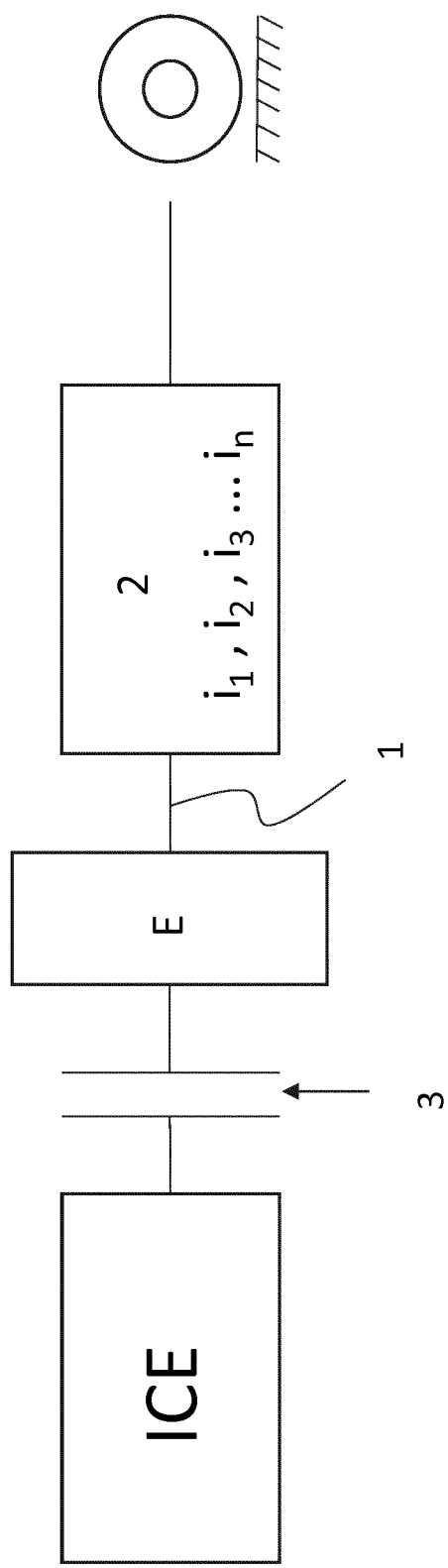
FIG. 4 is a prior art powertrain for a hybrid system used in heavy trucks and busses wherein an electric motor E is attached to the input shaft 1 of an automated manual transmission (AMT).
Figure 5:
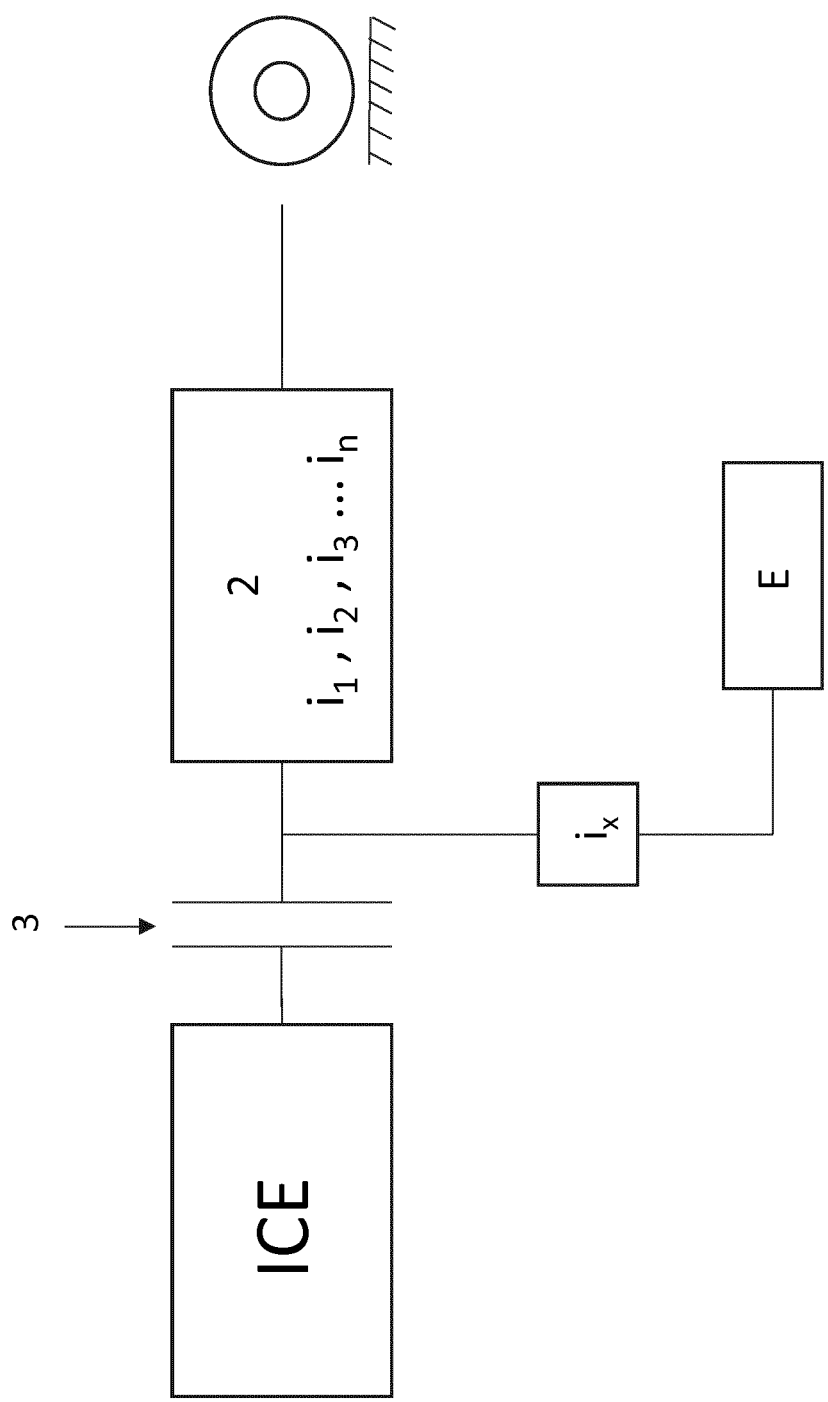
FIG. 5 is a prior art powertrain essentially having the same functionality as the powertrain shown in FIG. 4.
Figure 8:
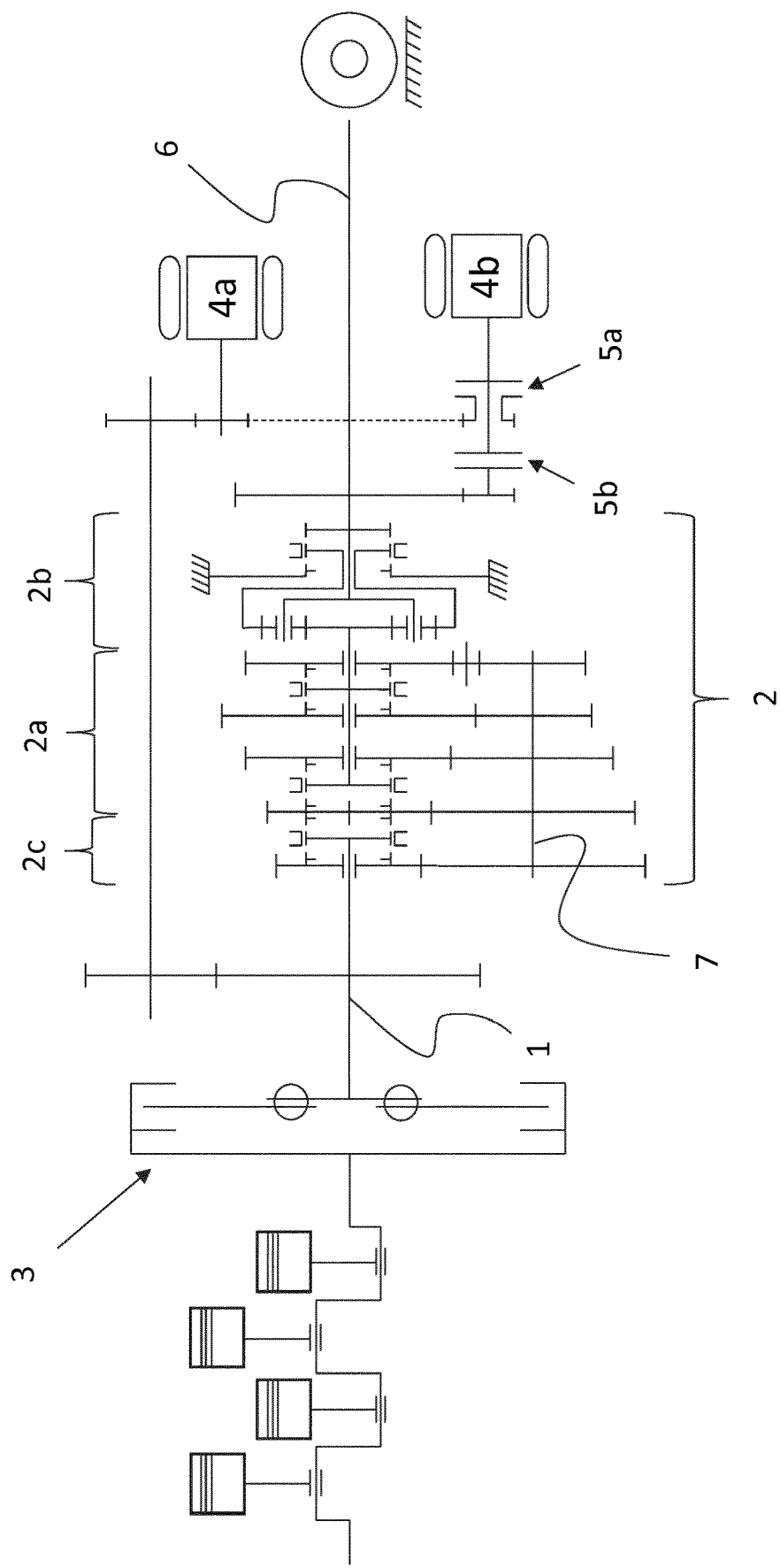
FIG. 8 is a detailed schematic drawing showing an exemplary powertrain according to the invention. The schematic drawing is based on the prior art powertrain in FIG. 2.

FIG. 8 shows an exemplary hybrid powertrain according to the invention featuring a generic layshaft transmission as shown in FIG. 2. Most generic transmissions have a modular design in which for instance a module featuring additional creep gears may be attached at an input side of a transmission 2 featuring main gears 2*a* (or main part of the transmission), split gears 2*c* and range gears 2*b* (the transmission may i.e. be termed a gearbox). In FIG. 8 the inventive powertrain is based on a standard heavy-duty truck transmission, wherein the standard parts of the transmission are unchanged. The first electric motor 4*a* is connected to the input shaft 1 (or input side) of the transmission, in the same manner and position as a module comprising additional creep gears are normally connected. The second electric motor 4*b* is connected to the output shaft 6 (or output side), in the same manner and position as a retarder module is commonly connected. In the specific embodiment of FIG. 8, the first and second electric motors provide the same functionality as commonly provided by the creep gears and the retarder system. Alternatively, the inventive powertrain may also comprise any of additional creep gears and a retarder module if required. In the present description, the specific feature described by the term "layshaft" is intended to mean a shaft comprising gears and running in parallel to the input shaft of a transmission, i.e. layshaft 7 as shown in FIG. 8.

Figure 9:
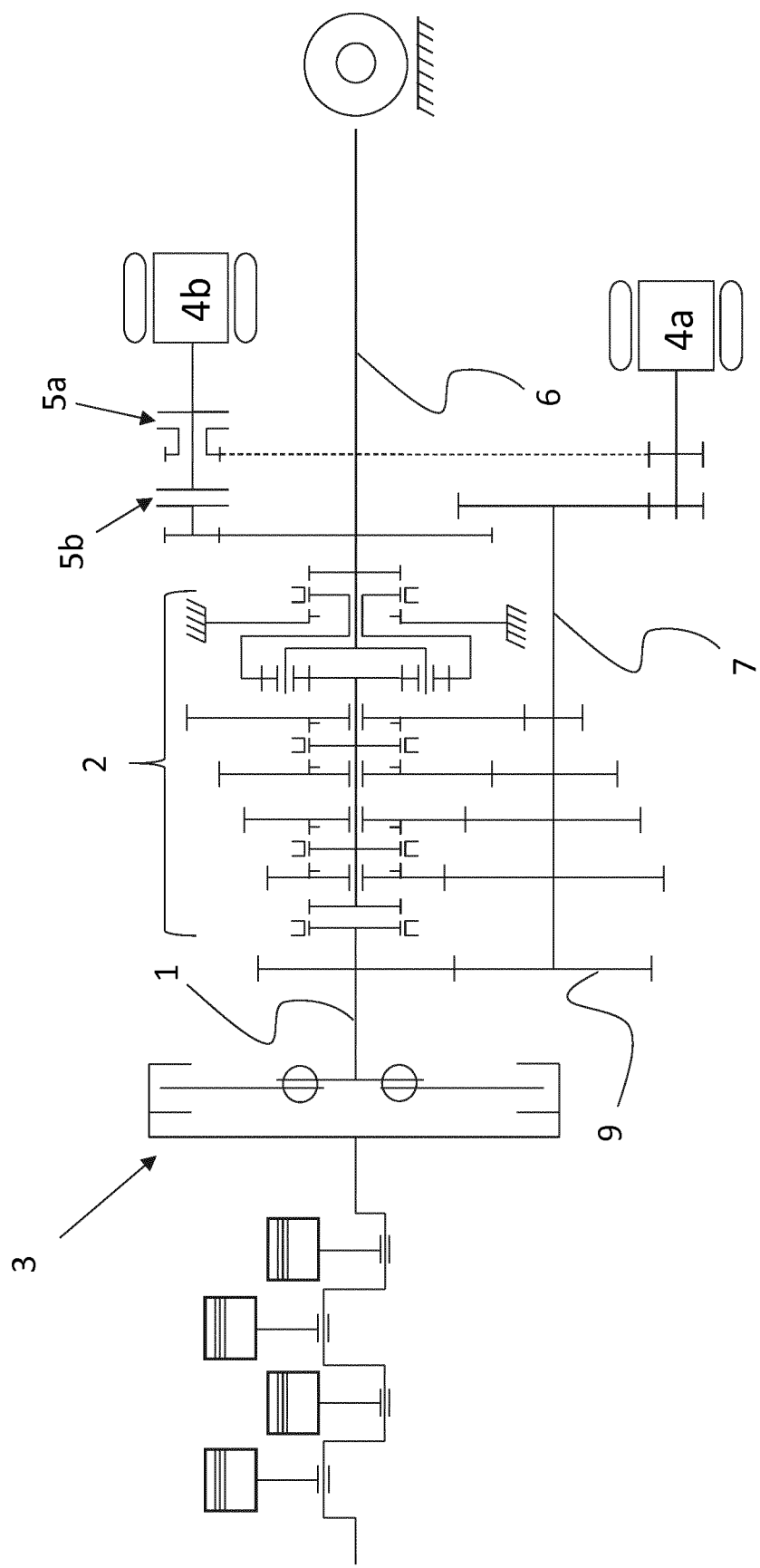
FIG. 9 is a detailed schematic drawing showing an exemplary powertrain according to the invention. The schematic drawing is based on the prior art transmission in FIG. 2.

FIG. 9 shows an exemplary hybrid powertrain according to the invention featuring a transmission similar to the one shown in FIG. 2, wherein the transmission 2 is somewhat optimized for use in a hybrid powertrain. In FIG. 9 the internal gears are redesigned, but the range gear is essentially unchanged, and the reverse gear is replaced by a forward gear. A reverse drive is obtained by merely rotating at least the first electric motor 4a in the opposite direction. Further simplification of the transmission in FIG. 2 is done by removing the split gear arrangement and by connecting the first electric motor to the input shaft 1 via a gear 9 on the layshaft 7 of the transmission. The transmission/gearbox of FIG. 9 has 5 main gears multiplied with the 2 range gears (10 gears total). In addition, when the two clutches 5a,5b of the inventive powertrain are in a fully engaged state (i.e. transferring full torque) they will work as an additional gear. The redesign of the internal gears is expected to provide a cost reduction compared to the general transmission in FIG. 2. For many of the current transmissions this change of internal parts will require no or very small changes at the standard gearbox housing, of the actuator design for the gearshift and the main start up clutch 3.

Figure 10:
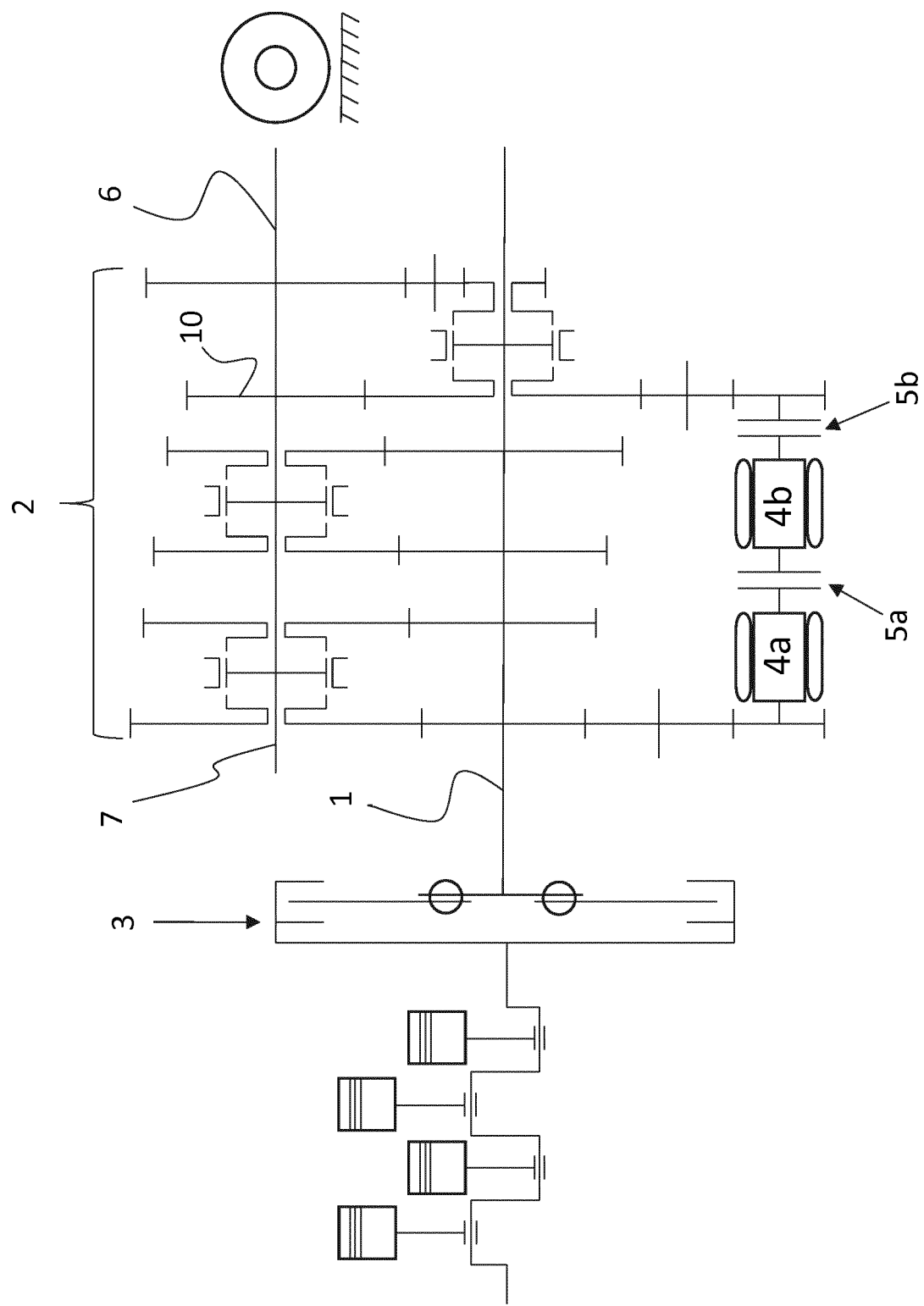
FIG. 10 is a detailed schematic drawing showing an exemplary powertrain according to the invention.

A detailed schematic drawing of a further exemplary embodiment of a powertrain according to the invention is shown in FIG. 10. The transmission 2 is a layshaft gearbox with 5 gears forward and 1 gear reverse. The lay shaft gearbox in this case could be made without synchronizers which further reduce the cost of the gearbox and increase the robustness. Typical for a layshaft gear box is the use of two parallel shafts and the use of a splined sleeve that connects the selected gear to the shaft so that torque can be transferred. The shaft running in parallel with the input shaft of the transmission 2 is commonly termed a layshaft 7. These gearboxes are known as the transmission with the highest efficiency and the lowest cost when multiple gear ratios are needed. In this embodiment, the first electric motor 4a and the second electric motor 4b are connected to the output shaft 6 via a gear 10 on the layshaft 7.

Figure 11:
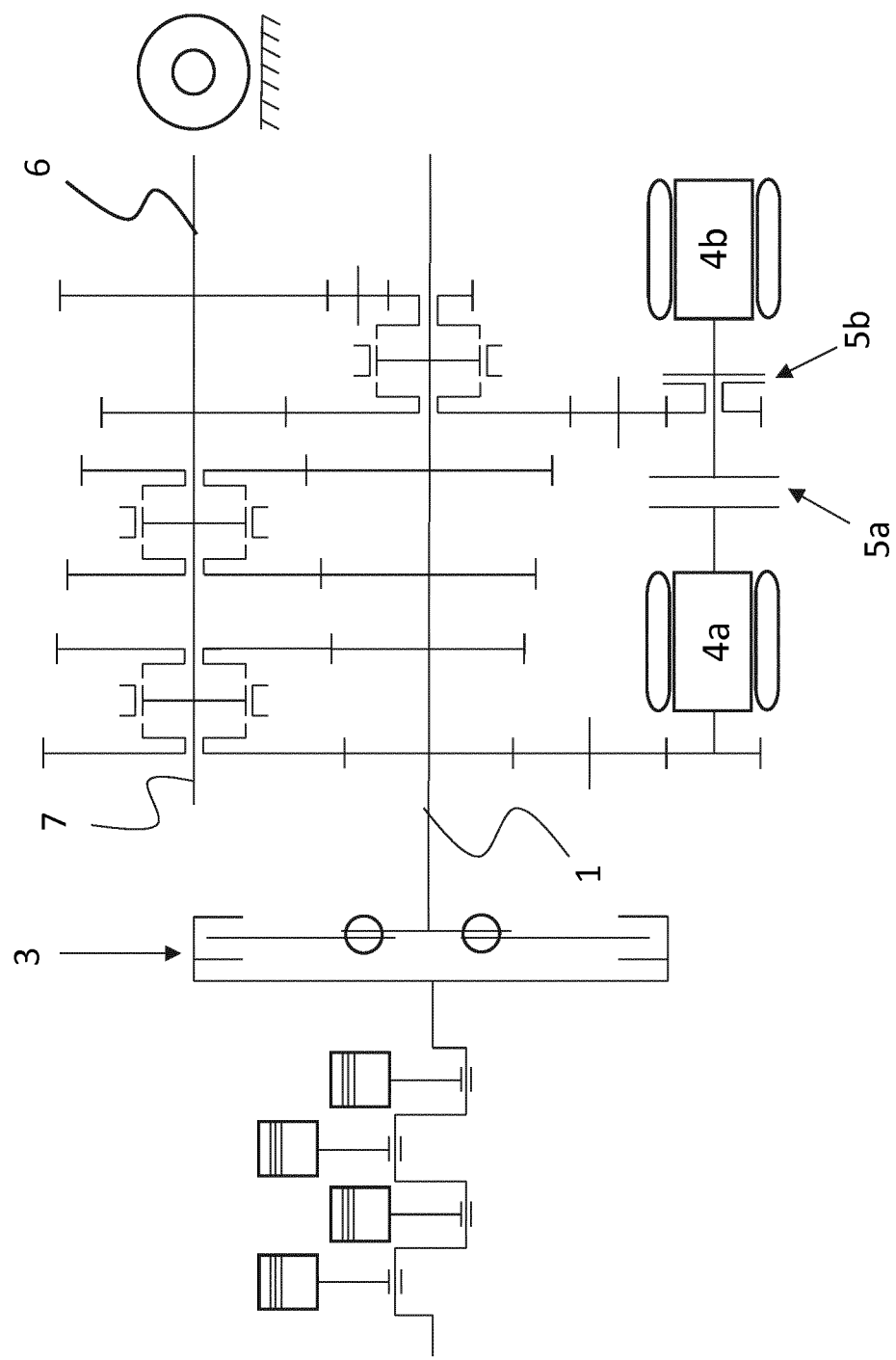
FIG. 11 is a detailed schematic drawing showing an exemplary powertrain according to the invention.
Figure 12:
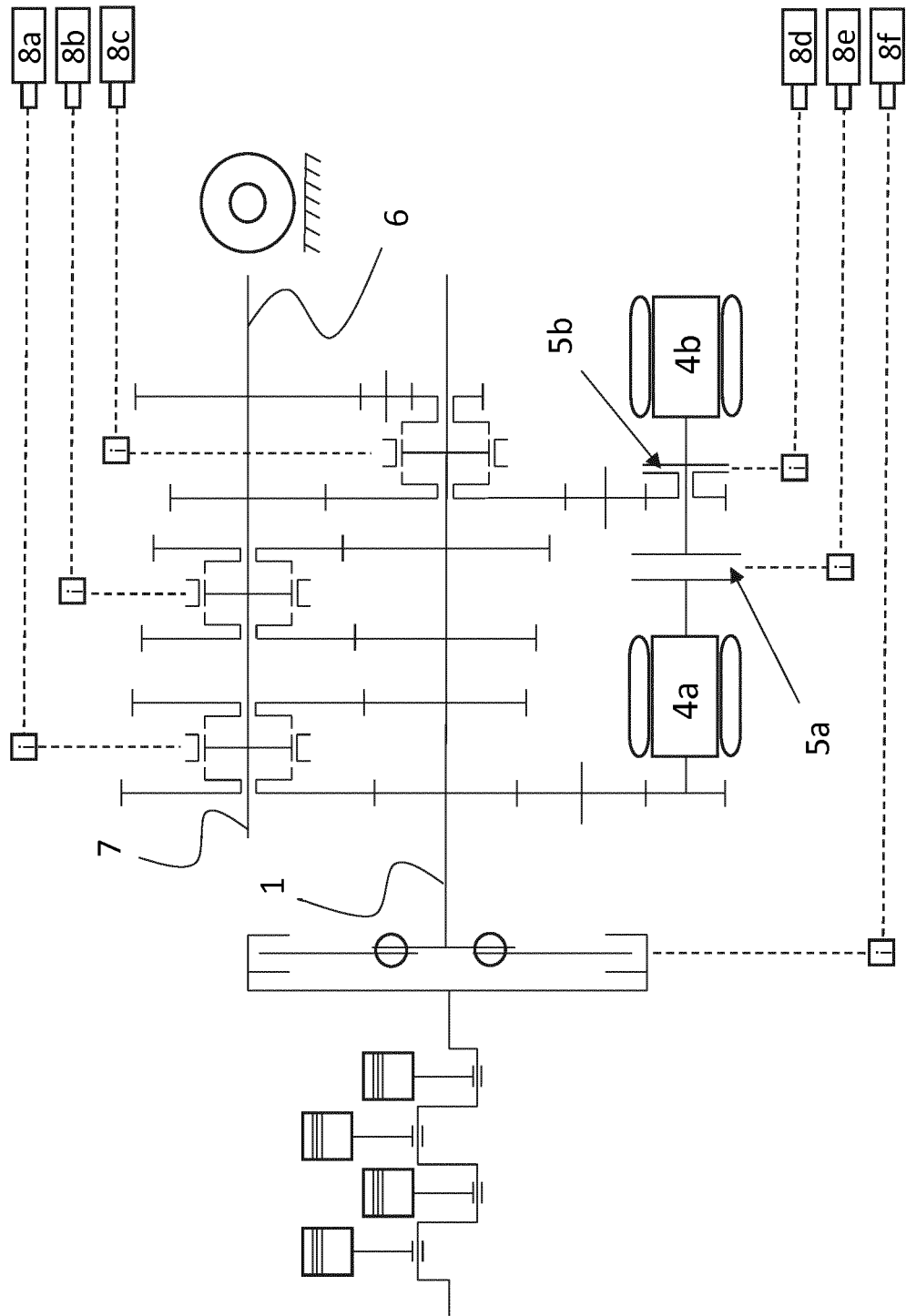
FIG. 12 is a detailed schematic drawing of the powertrain in FIG. 11 featuring electronically controlled actuators.

FIG. 11 shows detailed schematic drawing of a mechanical layout having the same functionality as the powertrain in FIG. 10, but with a small change so that the two clutches 5a,5b are placed in the same area and provides a better integration for both clutches and clutch actuators (see FIG. 12). In addition, this layout also provides more space for the electric motors and clutches in the longitudinal direction of the powertrain.

FIG. 12 shows the powertrain in FIG. 11 and illustrates how the powertrains of the present invention requires electronically controlled actuation of all the clutches 3, 5a and 5b and the gearshifts. The actuation may be performed by any suitable electronically controllable actuator 8a-8f including electro motoric, electric solenoid, electro hydraulic or pneumatic actuators. The various actuators 8a-8f may be controlled by a central control unit (not shown) based on input from a driver, e.g. via the drive and brake pedals, and optionally via data provided from a navigation system. Similar control systems are well-known in the prior art and described in for instance US 2002/0082134 A1 and WO 2007/102762 A1.

Figure 13:
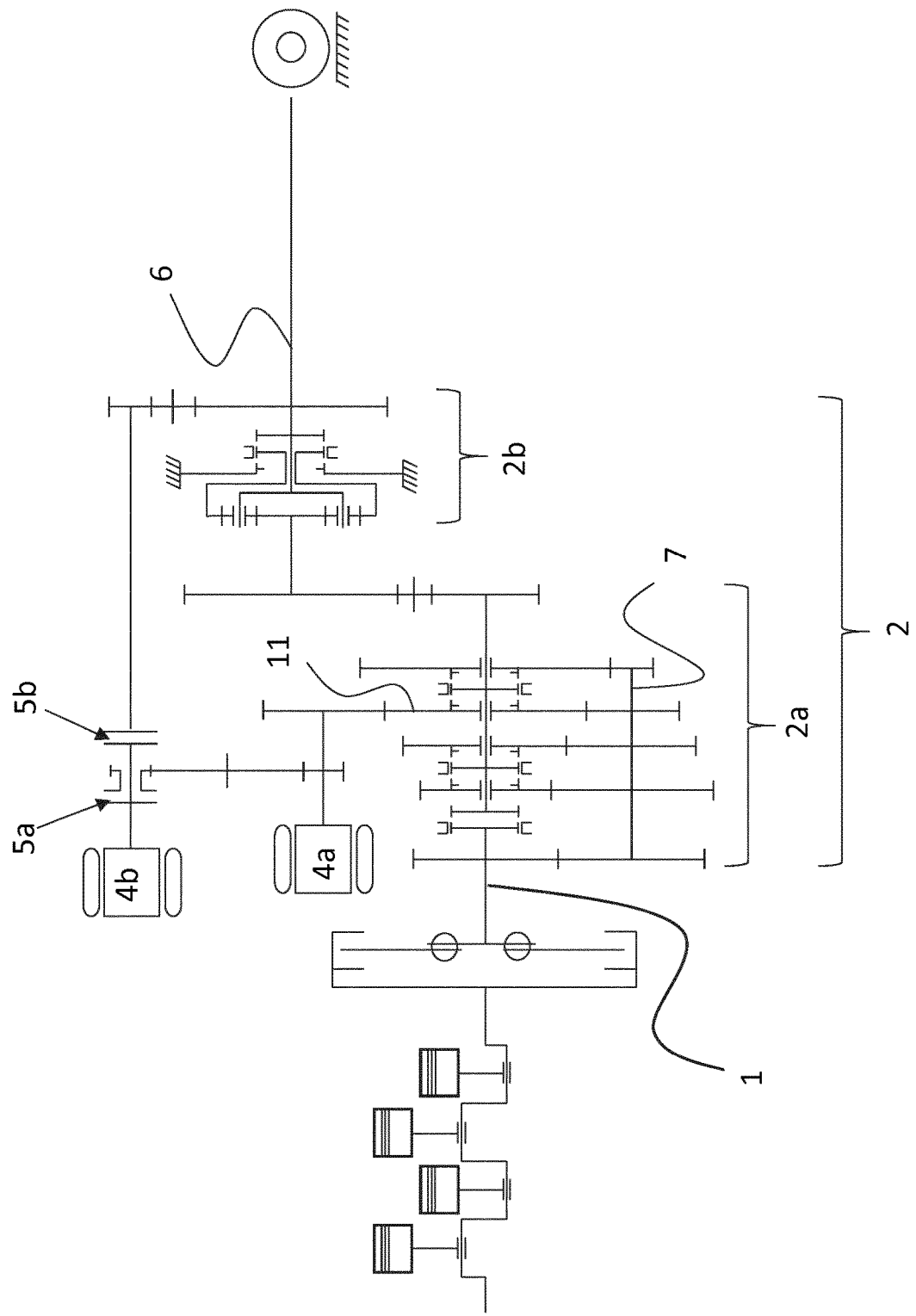
FIG. 13 is a detailed schematic drawing showing an exemplary powertrain according to the invention.

FIG. 13 shows a variant of the invention where the typical configuration would feature an ICE having a mechanical output power being relatively smaller than the combined mechanical output power of the first and second electric motor 4a,4b. The combined torque and power output of the three power sources ICE, 4a,4b is as required for the vehicle. In this configuration the ICE will typically work in a higher rpm range and with a lower torque output. This makes it possible to let the typical main part 2a of the transmission 2 (the part of the transmission featuring a layshaft 7) to run at a higher rpm with a lower torque resulting in a more compact transmission. This improvement is made possible by having a gear ratio before the final changeable gear ratio (usually called a range gear 2b). In the present embodiment a planetary range gear 2b is used, however any other suitable type of range gear may alternatively be used, such as a layshaft range gear. The first electric motor 4a is connected to the input shaft 1 of the transmission 2 via a gear 11 in the main part 2a of the transmission and the layshaft 7.

Figure 14:
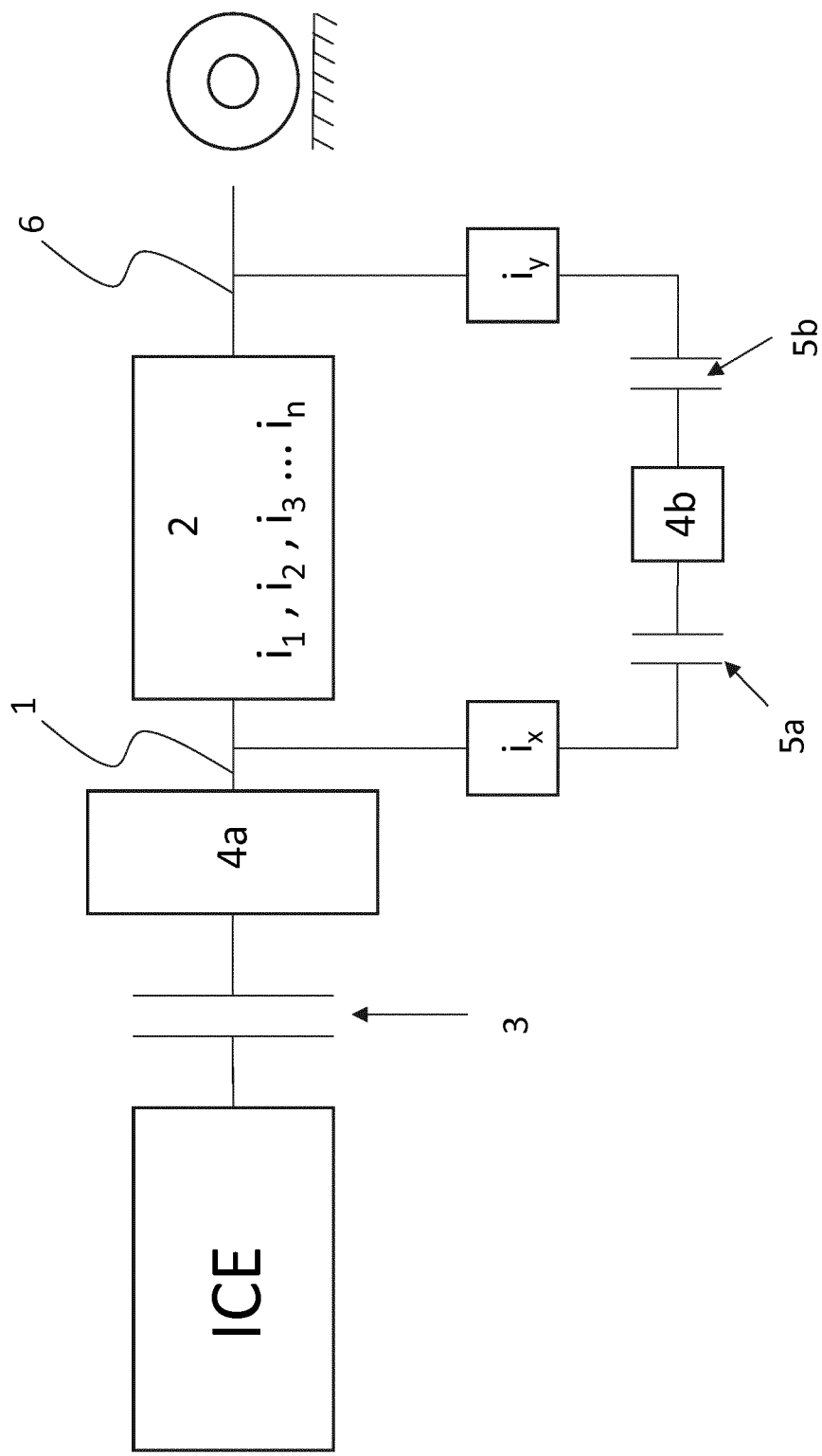
FIG. 14 is a block diagram of an exemplary powertrain according to the invention.

FIG. 14 Shows a block diagram of an exemplary powertrain according to the invention. The powertrain is an ICE-driven hybrid powertrain, wherein the electric motor 4a is placed concentric and fixed to the input shaft of the transmission 2. The second electric motor 4b is arranged as shown in FIG. 6.

Figure 15:
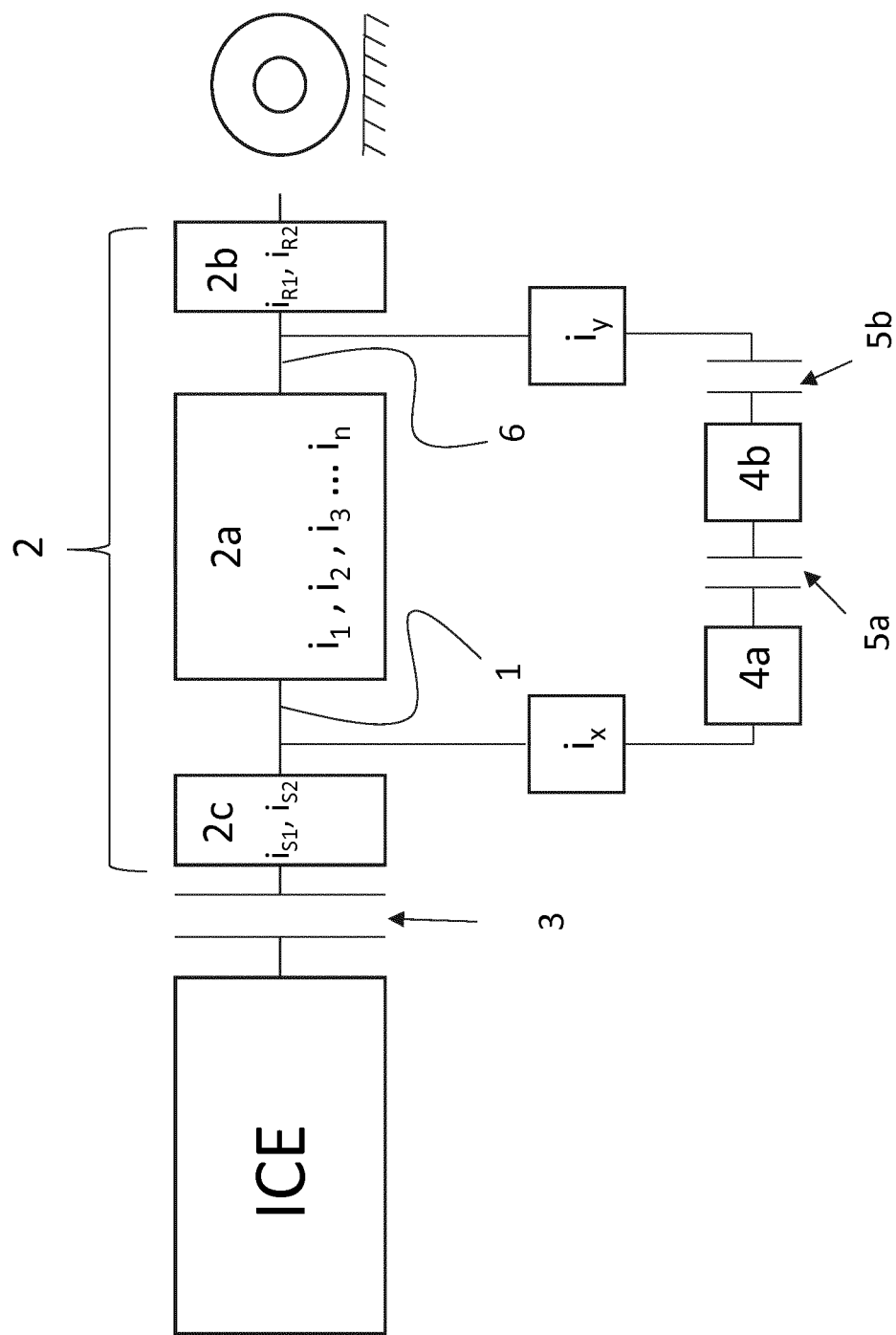
FIG. 15 is a block diagram of an exemplary powertrain according to the invention.

FIG. 15 Shows a block diagram of an exemplary powertrain according to the invention. In this embodiment the first electric motor 4a is connected to the input shaft 1 of a main part 2a of the transmission 2 (i.e. the part 2a comprising the main gears $i_1, i_2, i_3 \ldots i_n$) and the second electric motor 4b is connected to the output shaft 6 of the main part 2a of the transmission. In addition to the main part 2a, the transmission 2 features a range gear 2b and a split gear 2c.

Figure 16:
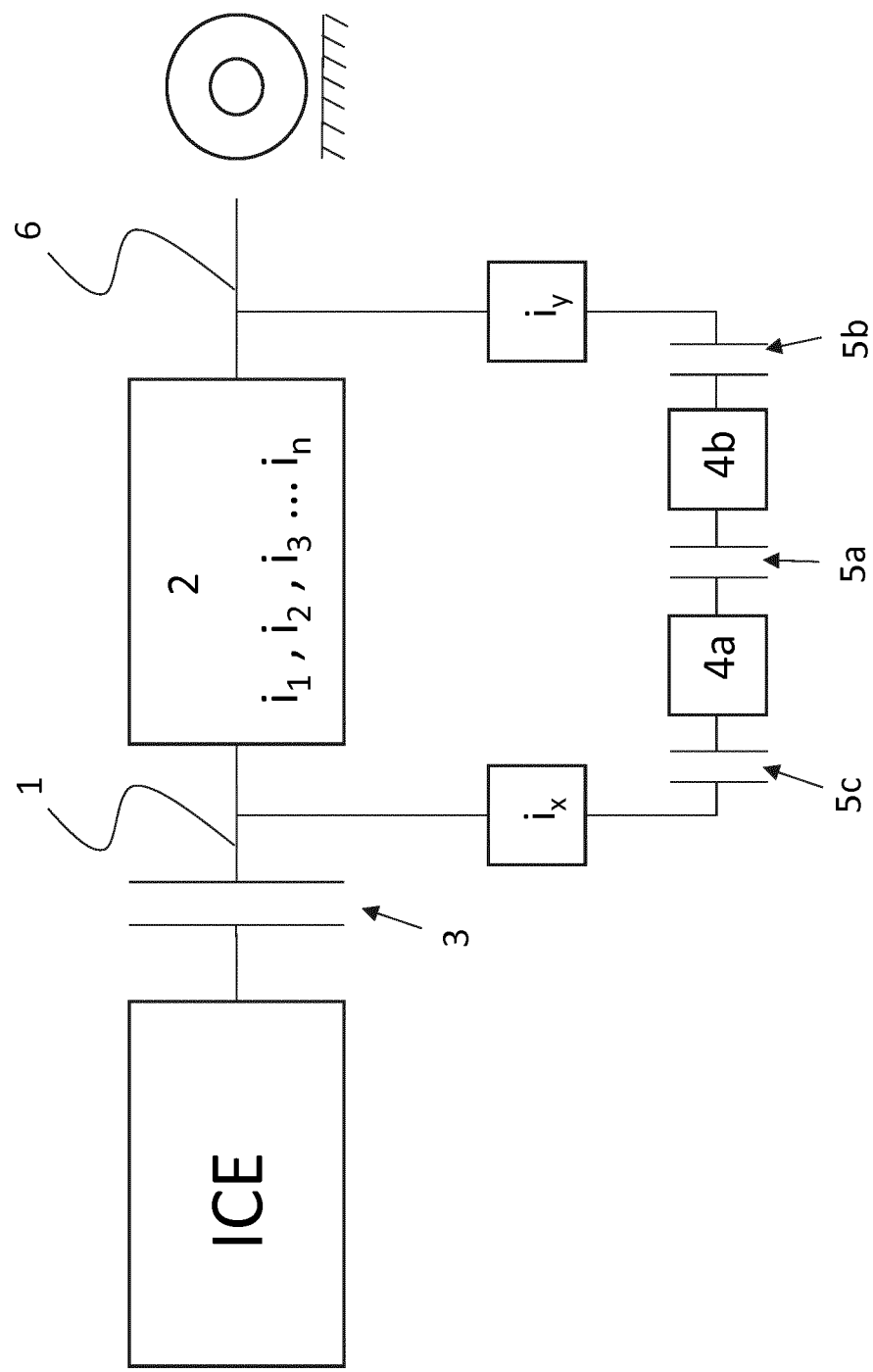
FIG. 16 is a block diagram of an exemplary powertrain according to the invention.
Figure 17:
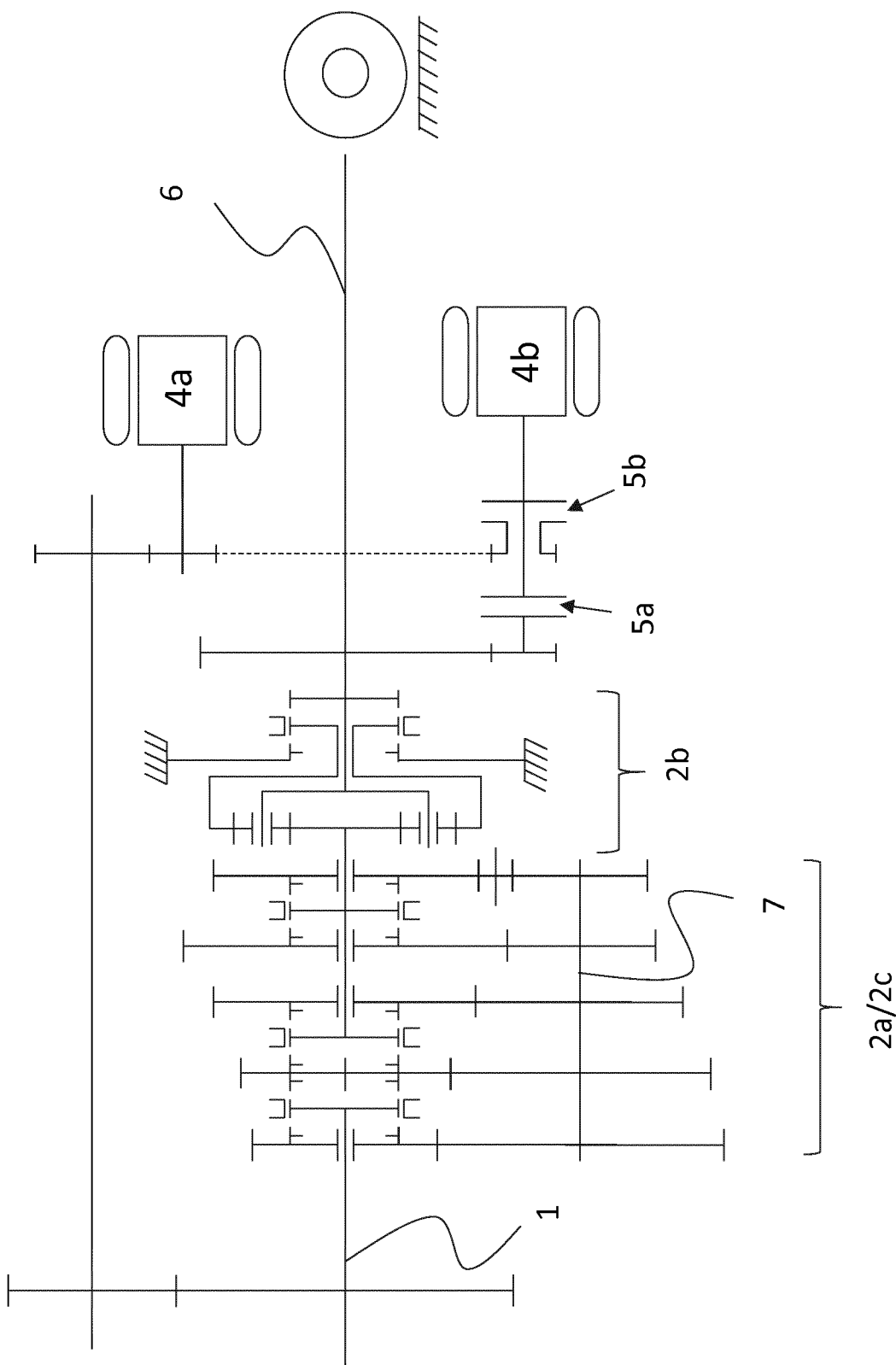
FIG. 17 is a detailed schematic drawing showing an exemplary powertrain according to the invention. The powertrain is similar to the powertrain in FIG. 8 without an ICE.

FIG. 16 shows an exemplary powertrain according to the invention featuring an additional clutch, i.e. a third clutch 5c, arranged between the first electric motor 4a and the input shaft 1. The third clutch 5c provides an additional flexibility and further improved functionality and efficiency in e.g. the following situations:

a. in driving situations where there is an advantage to connect the first electric motor 4a directly to the output shaft. This will especially be the case in gearshifts above the $i_y/i_x$ gear ratio.

b. in driving situations where the first electric motor 4a has performed the actions of disengaging/engaging and/or synchronizing the rpm of the input shaft 1 it will be possible to open the third clutch 5c and close the first clutch 5a and supply the torque from the first electric motor 4a to the output shaft 1 without any slip/loss in the first clutch 5a.

FIG. 17 is a detailed schematic drawing showing an exemplary powertrain according to the invention. The powertrain is similar to the powertrain in FIG. 8 without an ICE.

Figure 18:
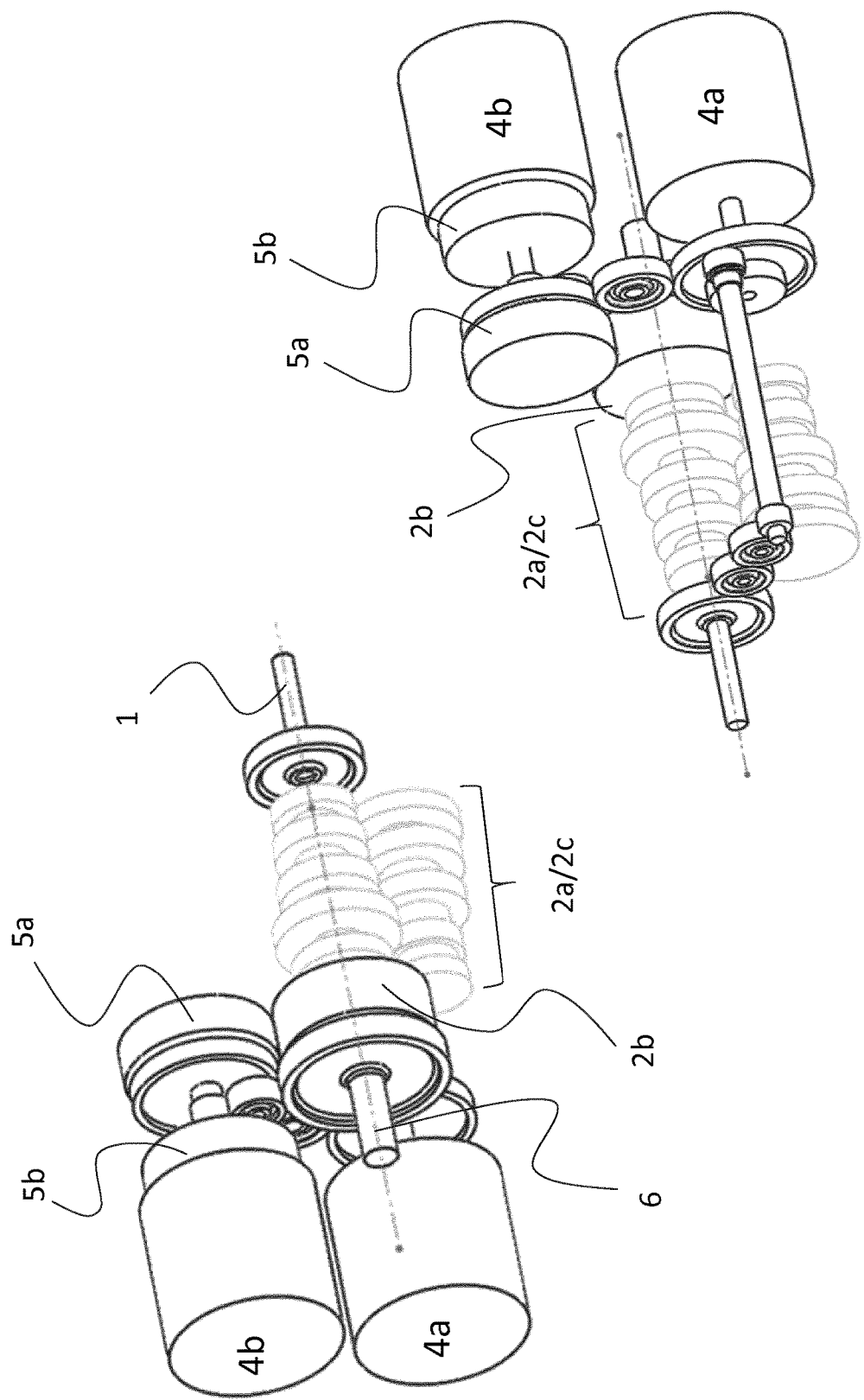
FIG. 18 are perspective views of an exemplary powertrain according to the schematic drawings in FIGS. 8 and 17.

Perspective views of an exemplary powertrain according to the schematic drawing of FIG. 17 is shown in FIG. 18. By connecting the powertrain to an ICE via a main clutch, the powertrain in FIG. 18 will correspond to the schematic drawing in FIG. 8.

FIG. 19 shows a powertrain that is specifically designed for use with only electric motors. This powertrain is designed so that there will be 4 gears in the transmission 2 and an additional gear available when the first clutch 5a and the second clutch 5b are fully engaged. This powertrain configuration provides the possibility of having a large spread in the gear ratios which is necessary to obtain an optimised system for heavy vehicles and/or for vehicles using the maximum of continuous power from the electric motor of longer time periods.

The above disclosed exemplary embodiments illustrate various technical solutions for obtaining a powertrain according to the invention. It is however noted that this is not an exhaustive disclosure of all embodiments of the invention. Based on the present disclosure the skilled person would be able to construct alternative powertrains which nevertheless will fall within the scope of the invention as defined by the appended claims.

Figure 20:
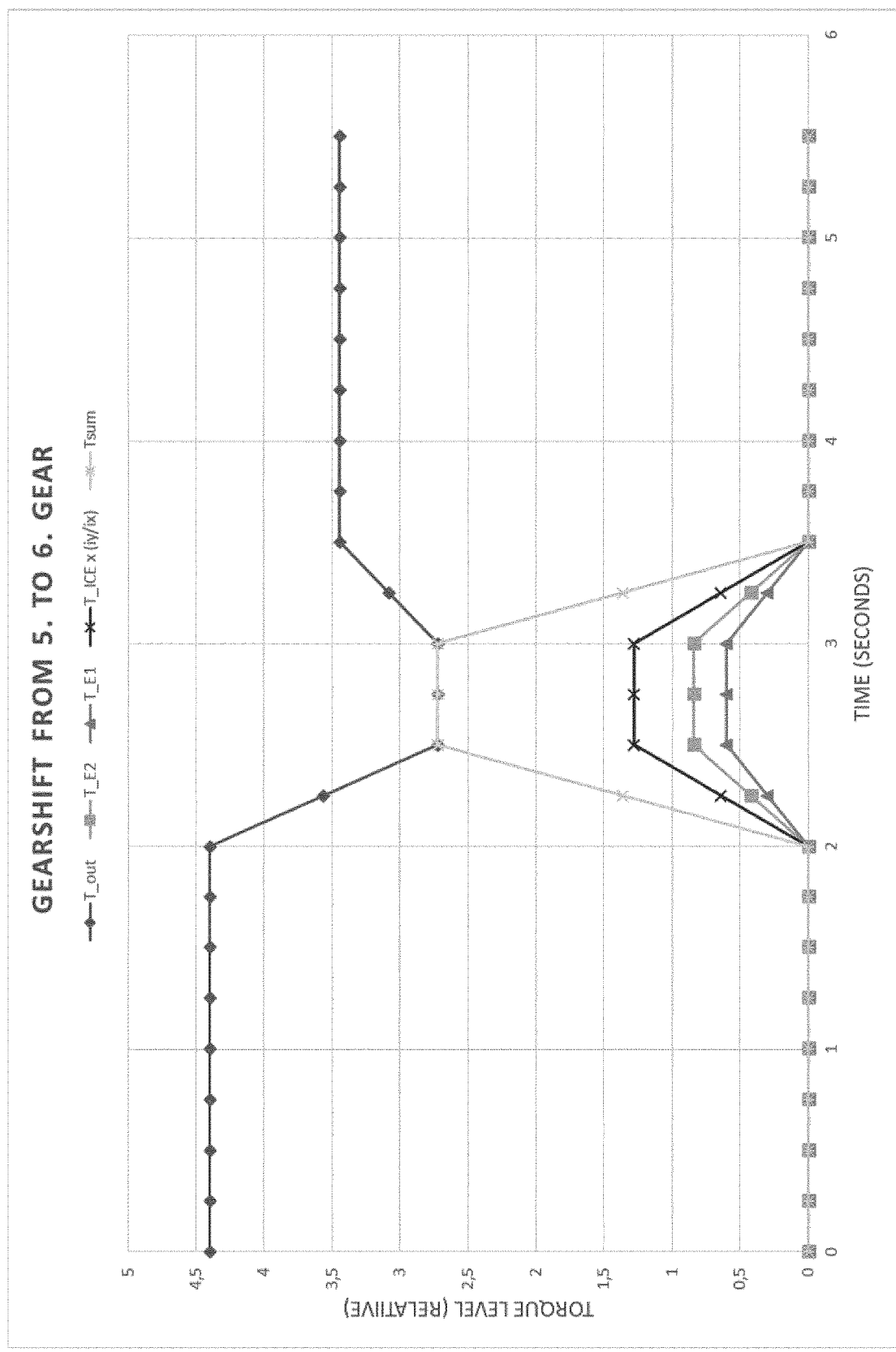
FIG. 20 is a graph showing the calculated torque levels of an exemplary gearshift process using a powertrain according to the invention.
Figure 21:
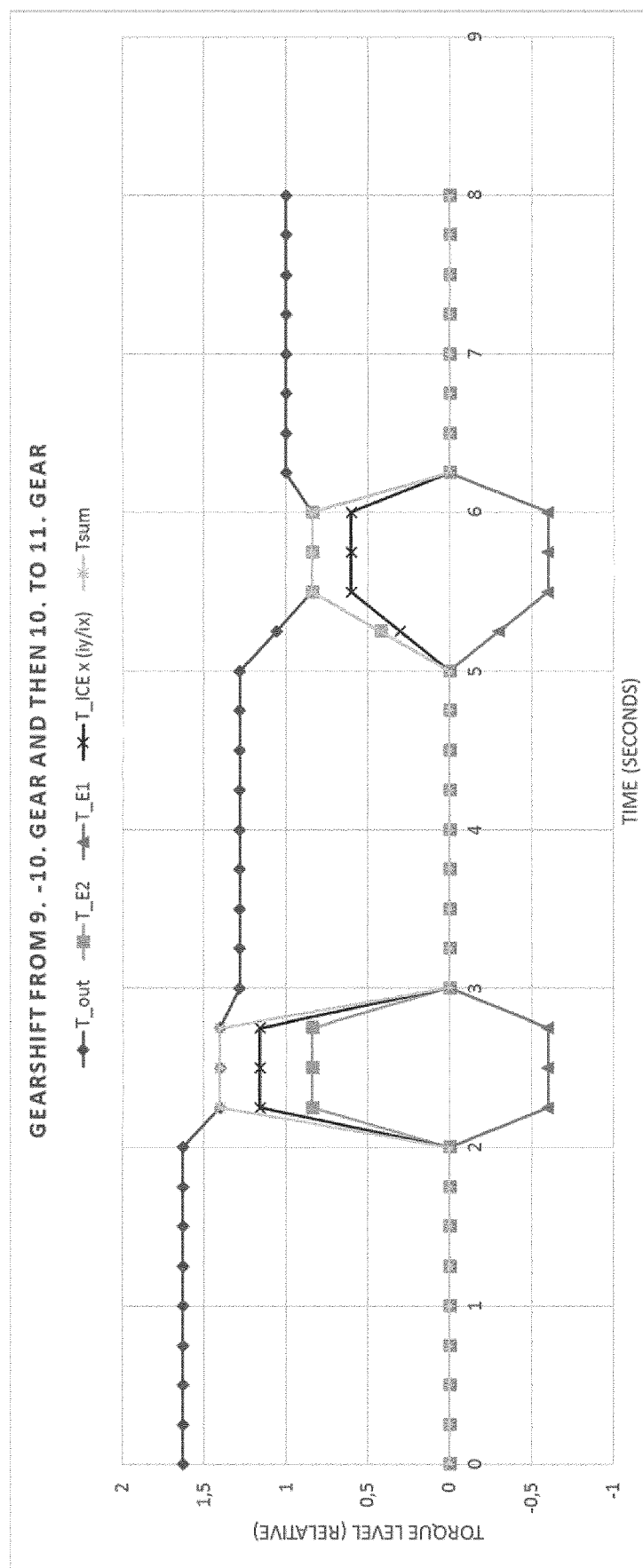
FIG. 21 is a graph showing the calculated torque levels of an exemplary gearshift process using a powertrain according to the invention.

The exemplary powertrains disclosed above provide an increased torque control during gearshifts. The graphs in FIGS. 20 and 21 show how the torque is controlled during gearshifts at different gears. The graphs illustrate how torque that may be transferred from the ICE (T_ICE), the first electric motor 4a (T_E1) and the second electric motor 4b (T_E2) without the further improved torque levels that may be achieved using the rotational kinetic energies connected to the ICE and the first and second electric motor 4a,4b. The graphs are calculated with the assumption that the ICE is relatively large, i.e. has a size similar to the ICE in heavy commercial trucks, is connected to a typical 12-speed AMT transmission and that the first and second electric motors 4a,4b are relatively small in size (torque) compared to the ICE. The gearshifts are done at full torque at the ICE. Many gearshifts are done at lower torque levels than the full ICE torque level and in these cases the electric transfer of power by the first and second electric motors 4a,4b will be a larger portion of the torque at the output shaft.

FIG. 20 shows a gearshift from $5^{th}$ to $6^{th}$ gear. In these graphs we are setting the torque from the ICE to be 1 and with the typical gear ratio of a 12-speed AMT transmission for $5^{th}$ gear being close to 4, 5 and the $6^{th}$ gear being close to 3,5. Consequently, the output shaft torque will be same as the gearing ratio in relative torque. In this gearshift, the powertrain according to the invention may be used to establish the highest possible torque fill. This means that both the ICE and the first and second electric motors 4a,4b will run as motors and provide mechanical power into the system. The torque available at the output shaft by use of the inventive powertrain will therefore be:

$$T_{sum} = (T\_E_1 \times i_y) + (T\_E_2 \times i_y) + (T\_ICE \times (i_y/i_x))$$

When the gears are disengaged the only torque at the output shaft will be provided by the combined torque output of the first and second electric motors 4a,4b and the ICE via the first and second clutches 5a,5b. This gearshift follows the description of positive torque upshift control strategy disclosed below.

A gearshift from $9^{th}$ to $10^{th}$ gear and then $10^{th}$ to $11^{th}$ gear is shown in FIG. 21. Since the gearshifts are in higher gears than the gearshift shown in FIG. 20, the torque on the output shaft is clearly lower than shown in FIG. 20. The torque from the second electric motor 4b (T_E2) will therefore be the largest part of the torque transferred to the output shaft during the gearshifts. It is also important to note that this gearshift operates with the first electric motor 4a running as a generator and therefor reduces the torque in the first clutch 5a, thereby improving the overall efficiency and reducing wear in the first clutch 5a. The $i_y/i_x$ gear ratio is in this example decided to be the same as the gear ratio for the $10^{th}$ gear. This leads to a notable difference between the two gearshifts. For the $9^{th}$ to $10^{th}$ gear the ICE will be able to add an additional torque to the output shaft. For the gearshift from $10^{th}$ to $11^{th}$ gear the rotational speed difference makes it impossible to increase the torque at the output shaft, but the gearshift will be done with the first clutch 5a open and the second clutch 5b closed and all power from the input shaft 1 is transferred electrically via the first and second electric motors 4a,4b to the output shaft.

It is likely that powertrain solutions where the output power and torque of the ICE is smaller or similar to the first and second electric motors 4a,4b will be optimal solutions in terms of fuel economy in many cases. This will also provide a powertrain solution where the torque fill will be significantly higher especially in the lower gears.

The inventive powertrains as described above have several advantageous functional features in common and the technical basis for these features are explained in the following:

Electric motors may be designed with a relationship between torque and rotational inertia having a far better rotational acceleration than the typical ICE. The high rotational acceleration is very useful for the first electric motor 4a since it provides a huge advantage in controlling the input shaft to obtain the correct rotational speed (rpm) as fast as possible. The other advantage of the electric motor is also the possibility of having a very fast change in the torque from the motor. Both of these properties of the electric motor are put to use in the inventive powertrain in a non-obvious manner.

At the same time as the first electric motor 4a takes advantage of the above properties to control the rpm of the input shaft 1, the second electric motor 4b will have a big effect in providing torque to the output shaft 6. The torque is predominantly produced by electric power in the second electric motor 4b. Consequently, it is likely that in many embodiments of the inventive powertrain, the second electric motor may be larger than the first electric motor. The second electric motor 4b may additionally be boosted using inertia in the second electric motor 4b and partly in the first and second clutch 5a,5b and the connected gears 2 in between to improve the torque to the output shaft 6, especially in the short time period when the gears are disengaged and engaged. At this point the rpm must be kept stable at the input shaft 1, and it will not be possible to use the inertia of the ICE and the first electric motor 4a to boost the torque at the output shaft 6.

Since the control of the input shaft 1 rpm and the provision of torque to the output shaft 6 should be performed simultaneously, the advantage of having a powertrain comprising two electric motors and two clutches, as in the exemplary embodiments, is large. The advantageous effects are disclosed in more detail by the methods/processes described below.

It is noted that although the ability to transfer torque during gear shift (also termed torque fill, see FIGS. 20 and 21 as well as the description thereof) is a highly advantageous effect of the present invention, it is also important that the inventive powertrain provides significant reductions in the gear shift time, i.e. increased gear shift speed.

Although many of the gear shift processes/methods have maximum fuel efficiency as main focus, a major additional advantage of the inventive powertrain is the increased acceleration and comfort.

All the above described embodiments of the inventive powertrain provide several advantages related to improved and efficient gear shift processes/methods. In the following, the most important gear shift processes/methods are described by reference to the block diagram in FIG. 6.

I. A positive torque upshift

A positive torque upshift control strategy as shown in FIG. 20 may be performed by the following steps by reference to the block diagram in FIG. 6:
1. The first and second electric motors 4a,4b are running rotationally engaged with the input shaft 1 of the gearbox. The first clutch 5a is closed and the second clutch 5b is open.

2. Torque in the first electric motor 4a and the first clutch 5a is controlled to be equal to the torque in the main clutch 3. (at least the first clutch 5a is slipping). Torque is transferred to the driven wheels 8 (via the output shaft/side 6) by engaging a slipping second clutch 5b. It is noted that the torque in the second clutch 5b will typically be higher than in the first clutch 5a due to torque from the second electric motor 4b. The kinetic energy in the second electric motor 4b is used when braking the second electric motor 4b down in speed.
3. The low gear is disengaged.
4. The rotational speed of the input shaft 1 is reduced since the torque is higher in the first electric motor 4a and the first clutch 5a than in the main clutch 3.
5. When the rotational speed of the input shaft 1 is synchronous with the new and higher gear and the torque in the first electric motor 4a and the first clutch 5a is controlled to be equal to the torque in the main clutch 3 step 6 may be performed.
6. New higher gear is engaged. It is noted that the torque in the second clutch 5b is typically higher than in the first clutch 5a due to torque from the second electric motor 4b. The kinetic energy in the second electric motor 4b is used when braking the second electric motor 4b down in speed.
7. The full torque from the ICE is established in the main clutch 3.

In addition, it will also be possible to use kinetic energy from the ICE during step 2 to 6 to further increase the transferred torque during the gearshift. But this will require a more detailed control of the main clutch 3 and the ICE. However, this is a very likely control strategy to be added to the basic control strategy described above.

The control strategy will also change depending on the % of torque requested from the driver/cruise control or other input. Typically, most of the torque during a gear shift will be transferred over the first and second electric motors, if these two motors can keep up with the torque demand from the system. This will reduce heat and wear in the clutches in the system.

II. Positive torque upshift for above $i_y/i_x$ gear ratio

In most embodiments of the powertrain, the first electric motor 4a is connected to the input shaft 1 via a first gear $i_x$ and the second electric motor 4b is connected to the output shaft 6 via a second gear $i_y$. The torque transfer ability of the first clutch 5a and the second clutch 5b combined with the gear ratio $i_y/i_x$ is limited in that torque may not be transferred by the clutches from the input shaft 1 to the output shaft 6 when the gear ratio for higher gears to be shifted in the transmission 2 is higher than the gear ratio defined by $i_y/i_x$. Upshift with positive torque in the higher gears at the output shaft 6 will usually occur in a situation where the acceleration is finished, and the aim of the gearshift is to find the most economic gear for the driving situation (e.g. a steady cruising speed). Consequently, the need for torque fill in the higher gears is somewhat lower than for the lower and middle ratio gears.

A positive torque upshift to gear ratios above $i_y/i_x$ may be performed by the following steps:
1. The first and the second electric motor 4a,4b are running rotationally engaged with the input shaft 1 of the transmission 2. The first clutch 5a is closed and the second clutch 5b is open.
2. The first clutch 5a will start to disengage/slip (i.e. start a partial disengagement) and at the same time the second electric motor 4b will accelerate to get a rpm equal to or higher than the corresponding rpm from the output shaft 6 over the second clutch 5b.
3. This step may start in parallel with the second step. Torque in the ICE will start to be reduced while the main clutch 3 will start to slip (i.e. start a partial disengagement) and at the same time the first electric motor 4a will start to brake the input shaft 1.
4. The second clutch 5b will engage and start to build up a torque at the output shaft 6 to compensate for torque reduction from the actions in step 3 as soon as step 2 is achieved. Step 3 and 4 will happen simultaneously.
5. The torque in the first electric motor 4a is controlled to be equal to the torque in the main clutch 3 (preferably, the first clutch 5a has zero torque=fully disengaged).
6. A low gear is disengaged and at the same time torque is transferred to the driven wheels 8. The torque to the driven wheels 8 is obtained from the second electric motor 4b, which is run by electricity generated in the first electric motor 4a, obtained from a battery, or a combination thereof, and the second electric motor 4b applies torque to the output shaft 6 via the second clutch 5b.
7. The input shaft 1 speed is reduced by torque being higher in the first electric motor 4a than in the main clutch 3. The first clutch 5a is preferably fully disengaged and the main clutch 3 is slipping or fully disengaged.
8. When the input shaft 1 speed is synchronous with the new and higher gear and the torque in the first electric motor 4a is controlled to be equal to the torque in the main clutch 3, a new higher gear is engaged.
9. The full torque from the ICE is established in the main clutch 3.

An important advantage of the above method of performing a positive torque upshift for above iy/ix gear ratio is that the first electric motor 4a ensures that the input shaft 1 is synchronized much faster than what is possible by use of the ICE alone, since an ICE has significant moment of inertia and changing its rpm is slow. Thus, the inventive powertrain may provide a very fast gearshift since the higher gear may be engaged before the ICE reaches the lower rpm of the synchronized input shaft 1.

III. Increased torque level during gear shift by the optimised use of the first and the second electric motors. Typical full throttle in lower gears below gear ratio $i_y/i_x$.

The first and the second electric motors 4a,4b can in shorter periods of time (seconds/minutes) be boosted to a torque level significantly higher than the continuous power output. Boosted power are usually available for much longer time than a gearshift.

Kinetic energy connected to the first and the second electric motors 4a,4b may only provide an effect over a very short time period. However, the time required for disengaging/engaging a gear is typically about 100 ms and the kinetic energy may therefore provide an advantageous effect during a gear shift.

Description of a positive torque upshift control strategy where maximum torque and short gearshift time is targeted:
1. The first and the second electric motors 4a,4b are running rotationally engaged with the input shaft 1 of the transmission 2. The first clutch 5a is closed and the second clutch 5b is open.
2. Torque is transferred to the driven wheels 8 by engaging a slipping second clutch 5b. To achieve maximum torque at the output shaft 6, both the first and the second electric motors 4a,4b are running as electric motors (i.e. generates torque from electricity provided from a battery pack) and provides maximum positive torque to the second clutch 5b.
3. Torque in the first clutch 5a is controlled to be equal to the combined torque in the first electric motor 4a and the main clutch 3. The main clutch 3 will be controlled to have a small and limited speed difference.
4. A low gear is disengaged while using the rotational kinetic energy connected to the second electric motor to provide a maximum of torque to the output shaft 6.
5. The input shaft 1 speed is reduced by torque being higher in the first clutch 5a than in the combined torque in the first electric motor 4a and the main clutch 3. The main clutch 3 is slipping and in this manner the fastest possible gearshift time is achieved. At this point the kinetic energy connected to the first electric motor 4a and the input shaft 1/main clutch 3 is available to again increase the speed of the second electric motor 4b (this is done to make it possible to use the rotational kinetic energy when the new gear will be engaged).
6. When the input shaft 1 speed is synchronous with a new and higher gear and the torque in the first clutch 5a is controlled to be equal to the torque in 4a+3, the new higher gear is engaged while using the rotational kinetic energy connected to the second electric motor 4b to provide a maximum of torque to the output shaft 6.
7. The full torque from the ICE is established in the main clutch 3 without any slip in the main clutch 3.

IV. Positive torque downshift (e.g. kick-down)

Positive torque downshift is one of the most challenging gearshifts for all types of transmissions. The reason for this is that the ICE (or electric motor) will need to accelerate up to a higher rpm and it will take time before the torque is available on the new higher rpm. Two different driving situations where this is an important performance is:
a) Full throttle uphill and the power is not enough to keep up the speed. A quick downshift and torque fill will be important to keep the speed up as good as possible.
b) The other situation is what is usually called a kick-down. Which means that the throttle is opened full to give a fast acceleration. A quick downshift and torque fill will be important to make the waiting time for the new higher torque as low as possible.

A positive torque downshift control strategy:
1. The first and the second electric motors 4a,4b are running rotationally engaged with the input shaft 1 of the transmission 2. The first clutch 5a is closed and the second clutch 5b is open.
2. The main clutch 3 is disengaged as soon as possible to let the ICE start to accelerate.
3. Torque is transferred to the driven wheels by the second electric motor 4b and engaging a slipping second clutch 5b.
4. Combined torque in the first electric motor 4a and the first clutch 5a is controlled to be equal to the torque in the main clutch 3 (the first clutch 5a is at least slipping). Step 2, 3 and 4 occurs at the same time.
5. A low gear is disengaged as soon as step 4 is established.
6. The first electric motor 4a provides a maximum of boosted torque to accelerate the input shaft 1 speed to the speed of the lower gear. (It is noted that the first electric motor 4a will be able to accelerate quicker than the ICE, and the input shaft 1 will achieve the correct rpm for the lower gear before the ICE, such that the engagement of the lower gear can start or complete before the acceleration of the ICE is finished.)
7. When the input shaft 1 speed is synchronous with the new and lower gear and the combined torque in the first electric motor 4a and the first clutch 5a is controlled to be equal to the torque in the main clutch 3, the new lower gear is engaged.
8. The full torque from the ICE is established in the main clutch 3.

The control strategy will also change depending on the % of torque requested from the driver/cruise control or other input. If only a small increase in torque on the output shaft 6 is needed it will typically be possible to use somewhat more of the available torque from ICE, the first electric motor 4a and the second electric motor 4b to create a higher torque fill.

V. The first and the second electric motors 4a,4b used as starter and alternator for the ICE.

The use of electric motors in a hybrid powertrain as the alternator and starter is not new. The motivation for using these electric motors will be to save the cost of the standard alternator and starter. The main challenge usually associated with the starter function is to achieve this in all driving situations.

One of the advantage of a state of the art control software of a transmission or powertrain is that the system to a large extent will be able to foresee what will be needed for the next seconds in terms of required torque. This will also make it easier to start the ICE at the correct time.

Compared to prior art solutions, the inventive powertrain will have a much easier job to handle what will be a typical start-up of the ICE e.g. when the vehicle has been running with a low torque and needs to start-up the ICE. In many such situations it will be enough to engage the second electric motor 4b and the second clutch 5b to continue to give torque at the output shaft 6 while the first electric motor 4a and the first clutch 5a starts the ICE. It may also be possible to use the rotational kinetic energy in the first electric motor 4a and the input shaft 1 to start the ICE.

The anticipated most challenging situation is when the vehicle is driving in electric mode in one of the lower gears. At this point the second electric motor 4b and the second clutch 5b will not be able to give a significant torque at the output shaft 6 since the gear $i_y$ connecting the second electric motor 5b will be in the ratio of the higher gears.

Then the following control strategy for ICE start-up when driving in one of the lower gears would be of significant advantage:
1. The first and the second electric motors 4a,4b are running rotationally engaged with the input shaft 1 of the transmission 2. The first clutch 5a is closed (engaged) and the second and main clutch 5b, 3 are open (disengaged.
2. The system detects the ICE is requested to start then.
3. The first clutch 5a starts disengaging
4. As soon as the first clutch 5a starts to slip, the second electric motor 4b starts the boost mode (peak torque) to accelerate the rpm towards maximum rpm. This feature prevents excessive wear of the clutches and provides maximum effect from the electric motors.

5. During the disengagement of the first clutch 5a, the boost mode of the first electric motor 4a will compensate for the reduced torque from the first clutch 5a to the input shaft 1.
6. When available rotational kinetic energy and boosted torque of the second electric motor 4b is enough to start the ICE, the first clutch 5a and the main clutch 3 will be engaged simultaneously so that the sum of torque at the input shaft 1 will be zero. Thus, the applied additional torque at the first clutch $5a \times i_x$ will be same as the torque used to start the ICE with the engaging main clutch 3.

The quick change of torque possible in the first and the second electric motors 4a,4b makes it possible to filter the reaction at the input shaft 1 when ICE fires.

VI. Avoid gearshift at the ICE before hilltops—running in two different gears with the electric motor. Boost mode could also be of great support in this situation.

State of the art software for deciding when to change gear in the most fuel-efficient way in a modern commercial truck includes an overview of height profile, speed limits etc. of the road ahead. This includes the ability to avoid unnecessary gearshift e.g. like just before coming to a hilltop. This has proved to give a significant reduction in fuel consumption.

A very typical driving situation would be when a vehicle is driving in one of the highest gears and going uphill before a hilltop. The most fuel-efficient driving would be to use the first and second electric motors at their peak power to get up to the hill top at the desired speed. This may be achieved by the inventive powertrain by the following method/process:

1. The first and the second electric motors 4a,4b are running rotationally engaged with the input shaft 1 of the transmission 2. The first clutch 5a is closed (engaged) and the second clutch 5b is open (disengaged). ICE running with a closed main clutch 3.

As soon as the system detects that more torque is necessary, but only for a short time then:
2. The first electric motor 4a provides its maximum torque.
3. The first clutch 5a starts disengaging.
4. When the first clutch 5a starts slipping, the second electric motor 4b starts the boost mode (peak torque) to accelerate the rpm.
5. When the second electric motor attains the correct rpm, the second clutch 5b starts engaging.
6. Step 4 and 5 is continued until the first clutch 5a is fully open and the second clutch 5b is fully closed.

This method/process will be used in situations where the ICE is running with the main clutch 3 engaged and the second electric motor 4b is able to provide a higher torque to the output shaft 6 over the second clutch 5b than over the first clutch 5a. This will typically be the case in the higher gears, but since a large portion of the driving happens in the higher gears this will be a very common and used method/process.

VII. Changing load from the road or from a traffic slowly accelerating/slowing down Also, when driving in pure electric mode it is important to improve efficiency as much as possible since this gives a longer electric range and the alternative is to invest in a larger battery pack. The pure electric mode will be used at least when the torque demand is low for a period of time. This could be in slow-moving traffic, slow acceleration, slowing down or on a road that are relatively flat, but small inclination uphill or downhill. This strategy is particularly useful in low and medium speeds.

In such situations it will often be optimal that the first electric motor 4a runs on the input shaft 1 and that the second electric motor 4b is running rotationally engaged with the output shaft 6 (the second clutch 5b being closed). For instance, the first electric motor 4a may run in a gear giving the highest possible mechanical output without any gearshift action delaying the torque response. At the same time the second electric motor 4b may run connected to the output shaft 6 with a much lower rpm giving a very good efficiency for the low torque driving situations. This has proved to be a very efficient strategy for electric cars using one motor for the front wheels and one motor for the rear wheels. By the inventive powertrain this is now realised in combination with a transmission 2.

VIII. Negative torque downshifts

Description of a negative torque downshift control method/process:

1. The first and the second electric motors 4a,4b are running rotationally engaged with the input shaft 1 of the transmission 2. The first clutch 5a is closed (engaged) and the second clutch 5b is open (disengaged).
2. Torque in the first electric motor 4a and the first clutch 5a is controlled to be equal to the torque in the main clutch 3. At least the first clutch 5a is slipping. Torque is transferred to the driven wheels 8 by engaging a slipping second clutch 5b.
3. A high gear is disengaged
4. The input shaft 1 speed is increased by torque higher in the first electric motor 4a and the first clutch 5a than in the main clutch 3. The main clutch 3 is slipping. It is noted that the inventive powertrain has a significant advantageous effect in the fact that the second electric motor 4b may provide a negative torque at the output shaft 6 while the first electric motor 4a may quickly accelerate the input shaft 1 to the desired rpm and in this manner making the gearshift as fast as possible.
5. When the input shaft 1 speed is synchronous with a new and lower gear and the torque in the first electric motor 4a and the first clutch 5a is controlled to be equal to the torque in the main clutch 3, the new lower gear is engaged.
6. The targeted negative torque from the ICE is established in the main clutch 3.

IX. Negative torque upshifts

Description of a negative torque upshift control method/process:

1. The first and the second electric motors 4a,4b are running rotationally engaged with the input shaft 1 of the transmission 2. The first clutch 5a is closed (engaged) and the second clutch 5b is open (disengaged.
2. Torque in the first electric motor 4a and the first clutch 5a is controlled to be equal to the torque in the main clutch 3. At least the first clutch 5a is slipping. Torque is transferred to the driven wheels 8 by engaging a slipping second clutch 5b.
3. A low gear is disengaged
4. The input shaft 1 speed is decreased by torque higher in the first electric motor 4a and the first clutch 5a than in the main clutch 3. The main clutch 3 is slipping. It is noted that the inventive powertrain has a significant advantageous effect in the fact that the second electric motor 4b may provide a negative torque at the output shaft 6 while the first electric motor may quickly decelerate the input shaft 1 to the desired rpm and in this manner making the gearshift as fast as possible.
5. When the input shaft 1 speed is synchronous with a new and higher gear and the torque in the first electric motor 4a and the first clutch 5a is controlled to be equal to the torque in the main clutch 3, the new higher gear is engaged.
6. The targeted negative torque from the ICE is established in the main clutch 3.

Based on the above disclosure it is clear that the inventive powertrain provides numerous advantageous effects.

Although the above methods/processes are described by use of an inventive powertrain featuring an ICE, it is noted that many of the above described methods, and their advantages, are also applicable to embodiments of the inventive powertrain without an ICE. The positive torque upshift I, described above, may for instance be performed by the following steps:
1. The first and second electric motors 4a,4b are running rotationally engaged with the input shaft 1 of the gearbox 2. The first clutch 5a is closed and the second clutch 5b is open.
2. Torque in the first electric motor 4a and the first clutch 5a is controlled to be equal to the torque in the input shaft 1. (at least the first clutch 5a is slipping). Torque is transferred to the driven wheels 8 (via the output shaft 6) by engaging a slipping second clutch 5b. It is noted that the torque in the second clutch 5b will typically be higher than in the first clutch 5a due to torque from the second electric motor 4b, and the kinetic energy in the second electric motor 4b is used when braking this down in speed.
3. The low gear is disengaged.
4. The rotational speed of the input shaft 1 is reduced since the torque is higher in the first electric motor 4a and the first clutch 5a than in the input shaft 1.
5. When the rotational speed of the input shaft 1 is synchronous with the new and higher gear and the torque in the first electric motor 4a and the first clutch 5a is controlled to be equal to the torque in the input shaft 1 step 6 may be performed.
6. New higher gear is engaged. It is noted that the torque in the second clutch 5b is typically higher than in the first clutch 5a since torque from the second electric motor 4b and the kinetic energy in the second electric motor 4b is used when braking this down in speed.

The invention claimed is:
1. A powertrain comprising a transmission, a first electric motor and a second electric motor, wherein
the transmission comprises an input shaft to which a source of mechanical power may be connected, an output shaft and a gear assembly providing at least two different gear ratios that may be selected for transfer of mechanical power from the input shaft to the output shaft,
the first electric motor is connected to the input shaft via a first gear, such that torque and rotation may be transferred between the first electric motor and the input shaft, and
the second electric motor is connected to the input shaft via a first clutch and the first gear, such that torque and rotation may be transferred between the second electric motor and the input shaft, and connected to the output shaft via a second clutch and a second gear, such that torque and rotation may be transferred between the second electric motor and the output shaft, wherein the first electric motor is connected to the second electric motor via the first clutch, and the first clutch and the second clutch are friction clutches which may operate with a torque level controllable between zero and a maximum torque level, and the first electric motor, the second electric motor, the first clutch and the second clutch form parts of a torque transfer path bypassing the at least two different gear ratios, the torque transfer path arranged to transfer torque from the input shaft to the output shaft during a gearshift.

2. A powertrain according to claim 1, wherein the first electric motor is electrically connected to the second electric motor, such that the first electric motor may generate electric power from torque at the input shaft and transfer the generated electric power to the second electric motor.

3. A powertrain according claim 1, wherein the source of mechanical power is an internal combustion engine or at least one electric motor.

4. A powertrain according to claim 1, wherein the source of mechanical power is an internal combustion engine connected to the input shaft via a main clutch.

5. A powertrain according to claim 1, wherein the transmission comprises a layshaft, and any of the first electric motor and the second electric motor is connected to any of the input shaft or the output shaft via the layshaft.

6. A powertrain according to claim 1, wherein any of the first electric motor and the second electric motor is connected to the input shaft or the output shaft via a gear in the transmission.

7. A vehicle comprising a powertrain according to claim 1.

8. A method of performing a gearshift from a low gear to a high gear in a powertrain according to claim 4, comprising the steps of:
a. controlling the torque in the first electric motor and the first clutch to be equal to the torque in the main clutch;
b. transferring torque to the output shaft by engaging the second clutch;
c. disengaging the low gear;
d. reducing a rotational speed of the input shaft by having a higher torque in the first electric motor and the first clutch than in the main clutch; and
e. engaging the high gear when the rotational speed of the input shaft is synchronous with the high gear and the torque in the first electric motor and the first clutch is equal to the torque in the main clutch.

9. A method according to claim 8, comprising a step of establishing a required torque in the input shaft by any combination of the first electric motor, the second electric motor and an internal combustion engine after the high gear is engaged.

10. A method according to claim 9, wherein a required torque is obtained by establishing a full torque from the internal combustion engine in the main clutch.

11. A method according to claim 8, wherein step a, is preceded by a step of running the first and second electric motors rotationally engaged with the input shaft of the transmission, wherein the first clutch is closed and the second clutch is open.

12. A method of performing a gearshift from a low gear to a high gear in a powertrain according to claim 1, comprising the steps of:
a. controlling the torque in the first electric motor and the first clutch to be equal to the torque in the input shaft;
b. transferring torque to the output shaft by engaging the second clutch;
c. disengaging the low gear;

d. reducing a rotational speed of the input shaft by having a higher torque in the first electric motor and the first clutch than in the input shaft; and e. engaging the high gear when the rotational speed of the input shaft is synchronous with the high gear and the torque in the first electric motor and the first clutch is equal to the torque in the input shaft.

13. A method according to claim 12 comprising a step of disengaging the second clutch and transferring torque from the second electric motor to the input shaft following the step of engaging the high gear.

14. A method according to claim 12, wherein step a. is preceded by a step of running the first and second electric motors rotationally engaged with the input shaft of the transmission, wherein the first clutch is closed and the second clutch is open.

15. A method of performing a gearshift from a high gear to a low gear in a powertrain according to claim 4, comprising the steps of:

a. controlling the torque in the first electric motor and the first clutch to be equal to the torque in the main clutch;

b. transferring torque to the output shaft by engaging the second clutch;

c. disengaging the high gear;

d. increasing a rotational speed of the input shaft by having a higher torque in the first electric motor and the first clutch than in the main clutch; and e. engaging the low gear when the input shaft speed is synchronous with the low gear and the torque in the first electric motor and the first clutch is controlled to be equal to the torque in the main clutch.

16. A method according to claim 15, comprising a step of establishing a required torque in the input shaft by any combination of the first electric motor, the second electric motor and an internal combustion engine after the low gear is engaged.

17. A method according to claim 16, wherein the required torque is obtained by establishing full torque from the internal combustion engine in the main clutch.

18. A method according to claim 15, wherein step a. is preceded by a step of running the first and second electric motors rotationally engaged with the input shaft of the transmission, wherein the first clutch is closed and the second clutch is open.

19. A method of performing a gearshift from a high gear to a low gear in a powertrain according to claim 1, comprising the steps of:

a. controlling the torque in the first electric motor and the first clutch to be equal to the torque in the input shaft;

b. transferring torque to the output shaft by engaging the second clutch;

c. disengaging the high gear;

d. increasing a rotational speed of the input shaft by having a higher torque in the first electric motor and the first clutch than in the input shaft; and e. engaging the low gear when the rotational speed of the input shaft is synchronous with the low gear and the torque in the first electric motor and the first clutch is controlled to be equal to the torque in the input shaft.

20. A method according to claim 19 comprising a step of disengaging the second clutch and transferring torque from the second electric motor to the input shaft following the step of engaging the low gear.

21. A method according to claim 19, wherein step a. is preceded by a step of running the first and second electric motors rotationally engaged with the input shaft of the transmission, wherein the first clutch is closed and the second clutch is open.

\* \* \* \* \*